United States Patent
Ando et al.

(10) Patent No.: US 11,408,690 B2
(45) Date of Patent: *Aug. 9, 2022

(54) METHOD FOR PRODUCING ALUMINUM ALLOY CLAD MATERIAL

(71) Applicant: UACJ CORPORATION, Tokyo (JP)

(72) Inventors: Makoto Ando, Tokyo (JP); Atsushi Fukumoto, Tokyo (JP); Akio Niikura, Tokyo (JP)

(73) Assignee: UACJ CORPORATION, Tokyo (JP)

( * ) Notice: Subject to any disclaimer, the term of this patent is extended or adjusted under 35 U.S.C. 154(b) by 439 days.

This patent is subject to a terminal disclaimer.

(21) Appl. No.: 16/459,585

(22) Filed: Jul. 1, 2019

(65) Prior Publication Data

US 2019/0323788 A1 Oct. 24, 2019

Related U.S. Application Data

(62) Division of application No. 14/906,269, filed as application No. PCT/JP2014/003878 on Jul. 23, 2014, now abandoned.

(30) Foreign Application Priority Data

Jul. 29, 2013 (JP) .................................. 2013-157060

(51) Int. Cl.
*B23K 35/22* (2006.01)
*B23K 20/04* (2006.01)
(Continued)

(52) U.S. Cl.
CPC .............. *F28F 19/06* (2013.01); *B23K 20/04* (2013.01); *B23K 20/2336* (2013.01);
(Continued)

(58) Field of Classification Search
None
See application file for complete search history.

(56) References Cited

U.S. PATENT DOCUMENTS 6,555,251 B2    4/2003  Kilmer
9,976,200 B2 *  5/2018  Ando .................. B23K 1/19
(Continued)

FOREIGN PATENT DOCUMENTS

EP    0799667    10/1997
JP    H1053827    2/1998
(Continued)

OTHER PUBLICATIONS

Office Action of Europe Counterpart Application, dated Nov. 29, 2019, pp. 1-21.
(Continued)

*Primary Examiner* — George Wyszomierski
*Assistant Examiner* — Janell C Morillo
(74) *Attorney, Agent, or Firm* — JCIPRNET

(57) ABSTRACT

A method for producing an aluminum alloy clad material having a core material and a sacrificial anode material clad on at least one surface of the core material, wherein the core material comprises an aluminum alloy comprising 0.050 to 1.5 mass % (referred to as "%" below) Si, 0.050 to 2.0% Fe and 0.50 to 2.00% Mn; the sacrificial anode material includes an aluminum alloy containing 0.50 to 8.00% Zn, 0.05 to 1.50% Si and 0.050 to 2.00% Fe; the grain size of the sacrificial anode material is 60 μm or more; and a ratio R1/R2 is 0.30 or less, wherein R1 (μm) is a grain size in a thickness direction and R2 (μm) is a grain size in a rolling direction in a cross section of the core material along the rolling direction; a production method thereof; and a heat exchanger using the clad.

1 Claim, 1 Drawing Sheet

(51) Int. Cl.
- F28F 21/08 (2006.01)
- F28F 19/06 (2006.01)
- C22C 21/00 (2006.01)
- B23K 20/233 (2006.01)
- C22F 1/04 (2006.01)
- B23K 35/28 (2006.01)
- C23F 13/14 (2006.01)
- B23P 15/26 (2006.01)
- B32B 15/01 (2006.01)
- C22C 21/02 (2006.01)
- C22C 21/08 (2006.01)
- C22C 21/10 (2006.01)
- C22C 21/14 (2006.01)
- B23K 101/14 (2006.01)
- B23K 101/34 (2006.01)
- B23K 103/10 (2006.01)

(52) U.S. Cl.
CPC .............. *B23K 35/22* (2013.01); *B23K 35/28* (2013.01); *B23K 35/286* (2013.01); *B23K 35/288* (2013.01); *B23P 15/26* (2013.01); *B32B 15/016* (2013.01); *C22C 21/00* (2013.01); *C22C 21/02* (2013.01); *C22C 21/08* (2013.01); *C22C 21/10* (2013.01); *C22C 21/14* (2013.01); *C22F 1/04* (2013.01); *C23F 13/14* (2013.01); *F28F 21/089* (2013.01); *B23K 2101/14* (2018.08); *B23K 2101/35* (2018.08); *B23K 2103/10* (2018.08); *C23F 2201/00* (2013.01)

(56) References Cited

U.S. PATENT DOCUMENTS

| | | | |
|---|---|---|---|
| 9,976,201 B2 * | 5/2018 | Ando | B23K 35/002 |
| 2009/0020585 A1 * | 1/2009 | Fukumoto | F28F 21/089 |
| | | | 228/56.3 |
| 2009/0165901 A1 | 7/2009 | Koshigoe et al. | |
| 2010/0112370 A1 | 5/2010 | Ueda et al. | |

FOREIGN PATENT DOCUMENTS

| | | | |
|---|---|---|---|
| JP | H11209837 | | 8/1999 |
| JP | 2008111143 | | 5/2008 |
| JP | 2008216026 | | 9/2008 |
| JP | 2008261026 | A * | 10/2008 |
| JP | 2013036099 | | 2/2013 |
| WO | 2005118899 | | 12/2005 |
| WO | 2007042206 | | 4/2007 |

OTHER PUBLICATIONS

Richard Westergård et al., "New High Strength, Long-Life Aluminium Alloys with Excellent Sagging Resistance for Heat Exchanger Tube Applications", Vehicle Thermal Management Systems Conference & Exposition, 2005-01-2012, May 10-12, 2005. pp. 1-16.

* cited by examiner

METHOD FOR PRODUCING ALUMINUM ALLOY CLAD MATERIAL

CROSS-REFERENCE TO RELATED APPLICATION

This application is a divisional of and claims the priority benefit of U.S. application Ser. No. 14/906,269, filed on Jan. 20, 2016, now pending. The prior U.S. application Ser. No. 14/906,269 is a 371 application of an International PCT application serial no. PCT/JP2014/003878, filed on Jul. 23, 2014, which claims priority benefit of Japan application no. 2013-157060, filed on Jul. 29, 2013. The entirety of each of the above-mentioned patent applications is hereby incorporated by reference herein and made a part of this specification.

TECHNICAL FIELD

The present invention relates to a highly corrosion resistant and highly formable aluminum alloy clad material and a production method thereof and specifically relates to a highly corrosion resistant and highly formable aluminum alloy clad material which is preferably used as a material constituting a path of a refrigerant or hot compressed air in a heat exchanger such as a radiator and to a production method thereof. The invention further relates to a heat exchanger using the highly corrosion resistant and highly formable aluminum alloy clad material and in particular relates to a part forming a flow path of an automobile heat exchanger and the like.

BACKGROUND ART

Since aluminum alloys are light, have high thermal conductivity and can exhibit high corrosion resistance by appropriate treatment, aluminum alloys are used for automobile heat exchangers such as radiators, capacitors, evaporators, heaters or intercoolers. As a tube material of an automobile heat exchanger, a two-layer clad material having an Al—Mn-based aluminum alloy such as 3003 alloy as the core and a brazing filler metal of an Al—Si-based aluminum alloy or a sacrificial anode material of an Al—Zn-based aluminum alloy clad on a surface of the core or a three-layer clad material in which a brazing filler metal of an Al—Si-based aluminum alloy is further clad on the other surface of the core of such a two-layer clad material is used. A heat exchanger is generally produced by combining a tube material of such a clad material with a corrugated fin material and brazing the materials at a high temperature around 600° C.

The tube shape is more complex in new heat exchangers used for recent automobiles in order to further improve the performance. Accordingly, it is now required that the materials have higher formability. The formability of a tube material has been adjusted by H14 refining type achieved by process annealing during cold rolling or by H24 refining type achieved by finish annealing after cold rolling. However, it has become difficult to satisfy the recent demand for high formability by refining alone.

In addition, when a corrosive liquid exists on the inner or outer surface of the tube of a heat exchanger, a hole may be made in the tube by pitting corrosion or pressure resistance may deteriorate because uniform corrosion reduces the tube thickness, resulting in the breakage of the tube. As a result, there is risk of the leakage of the air, coolant or refrigerant circulating inside. For example, because a coolant flows in the tube of a radiator, sacrificial anticorrosion property has been given to the inner surface of the tube by cladding with a sacrificial anode material. However, as the tube shape has become complex as described above, the corrosive liquid sometimes concentrates at a particular part, and simple cladding of a sacrificial anode material as in the conventional techniques is sometimes insufficient for preventing the leakage.

Techniques for improving the formability and the corrosion resistance separately have been proposed. For example, techniques for improving the formability or the electric resistance welding property of a clad material are shown in PTLs 1 and 2. However, the PTLs do not describe any means for improving the corrosion resistance of the sacrificial anode material. On the other hand, a technique for improving the corrosion resistance of a clad material is shown in PTL 3. However, the PTL does not describe any means for improving the formability of the clad material.

Specifically, regarding the clad material described in PTL 1, the electric resistance welding property of the material is improved by adjusting the mean grain size of the core material in a cross section at right angles to the longitudinal direction to 30 μm or less. With respect to the sacrificial anode material, it is defined that the area percentage of $Mg_2Si$ with a grain size of 0.2 μm or more is 0.5% or less, however, this is also means for improving the electric resistance welding property. Only the amounts of Zn and Mg are defined regarding the corrosion resistance of the sacrificial anode material, and a technique which would improve the corrosion resistance more than the conventional techniques is not described or suggested at all.

With respect to the clad material described in PTL 2, the electric resistance welding property of the material is improved by using a core material with a fibrous structure. Regarding the sacrificial anode material, it is defined that the hardness of the core material and the hardness of the sacrificial anode material are 50 Hv or more and that the ratio of hardness (sacrificial anode material/core material) is less than 1.0, however, this is means for securing the fatigue strength after braze heating. Only the amounts of Zn and Mn are defined regarding the corrosion resistance of the sacrificial anode material also in this document, and a technique which would improve the corrosion resistance more than the conventional techniques is not described or suggested at all.

On the other hand, regarding the clad material described in PTL 3, the corrosion resistance in an alkaline environment is improved by adjusting the grain size of the sacrificial anode material to 100 to 700 μm. However, only the components are defined regarding the core material, and the structure, the mechanical properties and the like thereof are not described. Also, PTL 3 does not describe or suggest the improvement of the formability at all.

Therefore, it has been difficult with the conventional techniques to provide an aluminum alloy clad material which has excellent formability when the aluminum alloy clad material is used for example as a tube material of a heat exchanger and in which the sacrificial anode material has excellent corrosion resistance after braze heating.

CITATION LIST

Patent Literature

PTL 1: JP-A-H8-291354
PTL 2: JP-A-2010-255014
PTL 3: JP-A-H11-209837

SUMMARY OF INVENTION

Technical Problem

The invention has been completed to solve the problems and aims to provide a highly formable and highly corrosion resistant aluminum alloy clad material which has excellent formability and brazing property and in which the sacrificial anode material has excellent corrosion resistance after braze heating, a production method thereof and a heat exchanger using the aluminum alloy clad material. In particular, the aluminum alloy clad material according to the invention can be preferably used as a part forming a flow path of an automobile heat exchanger.

Solution to Problem

The present inventors have conducted intensive studies on the problems, and as a result, the inventors have found that the problems can be solved by using a core material and a sacrificial anode material which have specific alloy compositions and metal structures for the clad material and thus completed the invention.

That is, the first embodiment of the invention is an aluminum alloy clad material having an aluminum alloy core material and a sacrificial anode material clad on at least one surface of the core material, wherein the core material comprises an aluminum alloy comprising 0.05 to 1.50 mass % Si, 0.05 to 2.00 mass % Fe, 0.50 to 2.00 mass % Mn and a balance of Al and unavoidable impurities, the sacrificial anode material comprises an aluminum alloy comprising 0.50 to 8.00 mass % Zn, 0.05 to 1.50 mass % Si, 0.05 to 2.00 mass % Fe and a balance of Al and unavoidable impurities, a grain size of the sacrificial anode material is 60 μm or more, and a ratio R1/R2 is 0.30 or less, when R1 (μm) is a grain size in a thickness direction and R2 (μm) is a grain size in a rolling direction in a cross section of the core material along the rolling direction.

Also, the core material may comprise the aluminum alloy further comprising one or, two or more selected from 0.05 to 1.50 mass % Cu, 0.05 to 0.50 mass % Mg, 0.05 to 0.30 mass % Ti, 0.05 to 0.30 mass % Zr, 0.05 to 0.30 mass % Cr and 0.05 to 0.30 mass % V.

Also, the sacrificial anode material may comprise the aluminum alloy further comprising one or, two or more selected from 0.05 to 2.00 mass % Ni, 0.05 to 2.00 mass % Mn, 0.05 to 3.00 mass % Mg, 0.05 to 0.30 mass % Ti, 0.05 to 0.30 mass % Zr, 0.05 to 0.30 mass % Cr and 0.05 to 0.30 mass % V.

The second embodiment of the invention is an aluminum alloy clad material having an aluminum alloy core material, a sacrificial anode material clad on one surface of the core material and a brazing filler metal clad on the other surface of the core material, wherein the core material comprises an aluminum alloy comprising 0.05 to 1.50 mass % Si, 0.05 to 2.00 mass % Fe, 0.50 to 2.00 mass % Mn and a balance of Al and unavoidable impurities, the sacrificial anode material comprises an aluminum alloy comprising 0.50 to 8.00 mass % Zn, 0.05 to 1.50 mass % Si, 0.05 to 2.00 mass % Fe and a balance of Al and unavoidable impurities, the brazing filler metal comprises an aluminum alloy comprising 2.50 to 13.00 mass % Si, 0.05 to 1.20 mass % Fe and a balance of Al and unavoidable impurities, a grain size of the sacrificial anode material is 60 μm or more, and a ratio R1/R2 is 0.30 or less, wherein R1 (μm) is a grain size in a thickness direction and R2 (μm) is a grain size in a rolling direction in a cross section of the core material along the rolling direction.

Also, the brazing filler metal may comprise the aluminum alloy further comprising one or, two or more selected from 0.50 to 8.00 mass % Zn, 0.05 to 1.50 mass % Cu, 0.05 to 2.00 mass % Mn, 0.05 to 0.30 mass % Ti, 0.05 to 0.30 mass % Zr, 0.05 to 0.30 mass % Cr, 0.05 to 0.30 mass % V, 0.001 to 0.050 mass % Na and 0.001 to 0.050 mass % Sr.

Also, the core material may comprise the aluminum alloy further comprising one or, two or more selected from 0.05 to 1.50 mass % Cu, 0.05 to 0.50 mass % Mg, 0.05 to 0.30 mass % Ti, 0.05 to 0.30 mass % Zr, 0.05 to 0.30 mass % Cr and 0.05 to 0.30 mass % V.

Also, the sacrificial anode material may comprise the aluminum alloy further comprising one or, two or more selected from 0.05 to 2.00 mass % Ni, 0.05 to 2.00 mass % Mn, 0.05 to 3.00 mass % Mg, 0.05 to 0.30 mass % Ti, 0.05 to 0.30 mass % Zr, 0.05 to 0.30 mass % Cr and 0.05 to 0.30 mass % V.

The first aspect of the third embodiment of the invention is an aluminum alloy clad material having an aluminum alloy core material, an intermediate layer material clad on one surface of the core material, a brazing filler metal clad on a surface of the intermediate layer material such that the surface is not the core material side, and a sacrificial anode material clad on the other surface of the core material, wherein the core material comprises an aluminum alloy comprising 0.05 to 1.50 mass % Si, 0.05 to 2.00 mass % Fe, 0.50 to 2.00 mass % Mn, 0.05 to 0.50 mass % Mg and a balance of Al and unavoidable impurities, the intermediate layer material comprises an aluminum alloy comprising 0.05 to 1.50 mass % Si, 0.05 to 2.00 mass % Fe and a balance of Al and unavoidable impurities, the sacrificial anode material comprises an aluminum alloy comprising 0.50 to 8.00 mass % Zn, 0.05 to 1.50 mass % Si, 0.05 to 2.00 mass % Fe and a balance of Al and unavoidable impurities, the brazing filler metal comprises an aluminum alloy comprising 2.50 to 13.00 mass % Si, 0.05 to 1.20 mass % Fe and a balance of Al and unavoidable impurities, a grain size of the sacrificial anode material is 60 μm or more, and a ratio R1/R2 is 0.30 or less, wherein R1 (μm) is a grain size in a thickness direction and R2 (μm) is a grain size in a rolling direction in a cross section of the core material along the rolling direction.

Also, the brazing filler metal may comprise the aluminum alloy further comprising one or, two or more selected from 0.50 to 8.00 mass % Zn, 0.05 to 1.50 mass % Cu, 0.05 to 2.00 mass % Mn, 0.05 to 0.30 mass % Ti, 0.05 to 0.30 mass % Zr, 0.05 to 0.30 mass % Cr, 0.05 to 0.30 mass % V, 0.001 to 0.050 mass % Na and 0.001 to 0.050 mass % Sr.

Also, the core material may comprise the aluminum alloy further comprising one or, two or more selected from 0.05 to 1.50 mass % Cu, 0.05 to 0.30 mass % Ti, 0.05 to 0.30 mass % Zr, 0.05 to 0.30 mass % Cr and 0.05 to 0.30 mass % V.

Also, the sacrificial anode material may comprise the aluminum alloy further comprising one or, two or more selected from 0.05 to 2.00 mass % Ni, 0.05 to 2.00 mass % Mn, 0.05 to 3.00 mass % Mg, 0.05 to 0.30 mass % Ti, 0.05 to 0.30 mass % Zr, 0.05 to 0.30 mass % Cr and 0.05 to 0.30 mass % V.

Also, the intermediate layer material may comprise the aluminum alloy further comprising one or, two or more selected from 0.50 to 8.00 mass % Zn, 0.05 to 2.00 mass % Mn, 0.05 to 1.50 mass % Cu, 0.05 to 0.30 mass % Ti, 0.05 to 0.30 mass % Zr, 0.05 to 0.30 mass % Cr and 0.05 to 0.30 mass % V.

The second aspect of the third embodiment of the invention is an aluminum alloy clad material having an aluminum alloy core material, an intermediate layer material clad on one surface of the core material, a brazing filler metal clad on the surface of the intermediate layer material such that the surface is not the core material side, and a sacrificial anode material clad on the other surface of the core material, wherein the core material comprises an aluminum alloy comprising 0.05 to 1.50 mass % Si, 0.05 to 2.00 mass % Fe, 0.50 to 2.00 mass % Mn and a balance of Al and unavoidable impurities, the intermediate layer material comprises an aluminum alloy comprising 0.05 to 1.50 mass % Si, 0.05 to 2.00 mass % Fe, 0.50 to 8.00 mass % Zn and a balance of Al and unavoidable impurities, the sacrificial anode material comprises an aluminum alloy comprising 0.50 to 8.00 mass % Zn, 0.05 to 1.50 mass % Si, 0.05 to 2.00 mass % Fe and a balance of Al and unavoidable impurities, the brazing filler metal comprises an aluminum alloy comprising 2.50 to 13.00 mass % Si, 0.05 to 1.20 mass % Fe and a balance of Al and unavoidable impurities, a grain size of the sacrificial anode material is 60 μm or more, and a ratio R1/R2 is 0.30 or less, wherein R1 (μm) is a grain size in a thickness direction and R2 (μm) is a grain size in a rolling direction in a cross section of the core material along the rolling direction.

Also, the brazing filler metal may comprise the aluminum alloy further comprising one or, two or more selected from 0.50 to 8.00 mass % Zn, 0.05 to 1.50 mass % Cu, 0.05 to 2.00 mass % Mn, 0.05 to 0.30 mass % Ti, 0.05 to 0.30 mass % Zr, 0.05 to 0.30 mass % Cr, 0.05 to 0.30 mass % V, 0.001 to 0.050 mass % Na and 0.001 to 0.050 mass % Sr.

Also, the core material may comprise the aluminum alloy further comprising one or, two or more selected from 0.05 to 1.50 mass % Cu, 0.05 to 0.50 mass % Mg, 0.05 to 0.30 mass % Ti, 0.05 to 0.30 mass % Zr, 0.05 to 0.30 mass % Cr and 0.05 to 0.30 mass % V.

Also, the sacrificial anode material may comprise the aluminum alloy further comprising one or, two or more selected from 0.05 to 2.00 mass % Ni, 0.05 to 2.00 mass % Mn, 0.05 to 3.00 mass % Mg, 0.05 to 0.30 mass % Ti, 0.05 to 0.30 mass % Zr, 0.05 to 0.30 mass % Cr and 0.05 to 0.30 mass % V.

Also, the intermediate layer material may comprise the aluminum alloy further comprising one, two or more selected from 0.05 to 2.00 mass % Mn, 0.05 to 1.50 mass % Cu, 0.05 to 0.30 mass % Ti, 0.05 to 0.30 mass % Zr, 0.05 to 0.30 mass % Cr and 0.05 to 0.30 mass % V.

A method for producing the aluminum alloy clad material of the invention, comprising: a step of casting the aluminum alloys for the core material and the sacrificial anode material, respectively, a hot rolling step of hot rolling the cast sacrificial anode material ingot to a predetermined thickness, a cladding step of cladding the sacrificial anode material rolled to the predetermined thickness on at least one surface of the core material ingot and thus obtaining a clad material, a hot clad rolling step of hot rolling the clad material, a cold rolling step of cold rolling the hot-rolled clad material, and one or more annealing steps of annealing the clad material either during or after the cold rolling step or both during and after the cold rolling step: wherein in the hot clad rolling step, the rolling start temperature is 400 to 520° C., and the number of rolling passes each with a rolling reduction of 30% or more is restricted to five or less while the temperature of the clad material is 200 to 400° C., and the clad material is held at 200 to 560° C. for 1 to 10 hours in the annealing steps.

A method for producing the aluminum alloy clad material of the invention, comprising: a step of casting the aluminum alloys for the core material, the sacrificial anode material and the brazing filler metal, respectively, a hot rolling step of hot rolling the cast sacrificial anode material ingot and the cast brazing filler metal ingot to predetermined thicknesses, respectively, a cladding step of cladding the sacrificial anode material rolled to the predetermined thickness on one surface of the core material ingot, cladding the brazing filler metal rolled to the predetermined thickness on the other surface and thus obtaining a clad material, a hot clad rolling step of hot rolling the clad material, a cold rolling step of cold rolling the hot-rolled clad material, and one or more annealing steps of annealing the clad material either during or after the cold rolling step or both during and after the cold rolling step: wherein in the hot clad rolling step, the rolling start temperature is 400 to 520° C., and the number of rolling passes each with a rolling reduction of 30% or more is restricted to five or less while the temperature of the clad material is 200 to 400° C., and the clad material is held at 200 to 560° C. for 1 to 10 hours in the annealing steps.

A method for producing the aluminum alloy clad material of the invention, comprising: a step of casting the aluminum alloys for the core material, the intermediate layer material, the brazing filler metal and the sacrificial anode material, respectively, a hot rolling step of hot rolling the cast intermediate layer material ingot, the cast brazing filler metal ingot and the cast sacrificial anode material ingot to predetermined thicknesses, respectively, a cladding step of cladding the intermediate layer material rolled to the predetermined thickness on one surface of the core material ingot, cladding the brazing filler metal rolled to the predetermined thickness on a surface of the intermediate layer material such that the surface is not the core material side, cladding the sacrificial anode material rolled to the predetermined thickness on the other surface of the core material ingot and thus obtaining a clad material, a hot clad rolling step of hot rolling the clad material, a cold rolling step of cold rolling the hot-rolled clad material, and one or more annealing steps of annealing the clad material either during or after the cold rolling step or both during and after the cold rolling step: wherein in the hot clad rolling step, the rolling start temperature is 400 to 520° C., and the number of rolling passes each with a rolling reduction of 30% or more is restricted to five or less while the temperature of the clad material is 200 to 400° C., and the clad material is held at 200 to 560° C. for 1 to 10 hours in the annealing steps.

A heat exchanger using the aluminum alloy clad material of the invention, wherein the grain size of the sacrificial anode material after braze heating is 100 μm or more.

Advantageous Effects of Invention

The aluminum alloy clad material according to the invention can be formed excellently even into a complex tube shape when the aluminum alloy clad material is used as a tube material of a heat exchanger for example, and the sacrificial anode material has excellent corrosion resistance after braze heating. Also, the aluminum alloy clad material according to the invention has excellent brazing properties such as erosion resistance and can be preferably used as a part forming a flow path of a heat exchanger of an automobile or the like further in view of the lightness and the excellent thermal conductivity.

DESCRIPTION OF EMBODIMENTS

Figure 1:
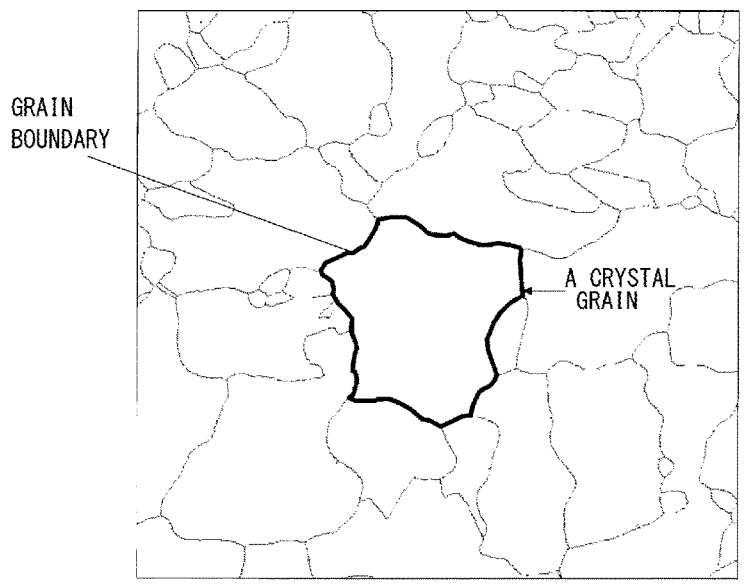
FIG. 1 A schematic figure illustrating a crystal grain surrounded by grain boundaries in a rolled surface of a sacrificial anode material.

Preferable embodiments of the aluminum alloy clad material according to the invention, the production method thereof and the heat exchanger using the aluminum alloy clad material are explained in detail.

1. Aluminum Alloy Clad Material

The aluminum alloy clad material according to the invention has a core material and a sacrificial anode material as essential parts and has a brazing filler metal and an intermediate layer material as additional parts. Here, excellent formability is exhibited by properly controlling the components and the metal structure of the core material, and excellent corrosion resistance is exhibited by properly controlling the components and the metal structure of the sacrificial anode material.

The first constitutional embodiment of the aluminum alloy clad material according to the invention is an embodiment having a core material and a sacrificial anode material clad on at least one surface thereof and specifically, the embodiment includes a case where both surfaces of the core material are clad with the sacrificial anode material and a case where one surface is clad with the sacrificial anode material and the other surface is not clad. For example, in the case of using a clad fin having a brazing filler metal in a heat exchanger and employing welding for the tube formation or the like, the surface of the core material which is not the sacrificial anode material side may be without cladding. The second embodiment is an embodiment having a core material, a sacrificial anode material clad on a surface thereof and a brazing filler metal clad on the other surface. In this embodiment, a brazing filler metal is clad on the surface of the core material which is not the sacrificial anode material side when a tube is formed by brazing or a bare fin without any brazing filler metal is used. The third embodiment is an embodiment having a core material, an intermediate layer material clad on a surface thereof, a brazing filler metal clad on the surface of the intermediate layer material which is not the core material side and a sacrificial anode material clad on the other surface of the core material (the surface which is not the intermediate layer material side). The third embodiment has two aspects, namely the first aspect and the second aspect, due to the differences in the alloy compositions of the core material and the intermediate layer material. In the third embodiment, the sacrificial anticorrosion effect is further improved and the degree of deterioration of the brazing property is reduced by cladding an intermediate layer material between the core material and the brazing filler metal.

The components of the core material, the sacrificial anode material, the brazing filler metal and the intermediate layer material are explained below.

2. Core Material

An aluminum alloy comprising 0.05 to 1.50 mass % (simply indicated by "%" below) Si, 0.05 to 2.00% Fe and 0.50 to 2.00% Mn as essential elements and a balance of Al and unavoidable impurities is used for the core material in the first embodiment, the second embodiment and the second aspect of the third embodiment.

An aluminum alloy which comprises one or, two or more selected from 0.05 to 1.50% Cu, 0.05 to 0.50% Mg, 0.05 to 0.30% Ti, 0.05 to 0.30% Zr, 0.05 to 0.30% Cr and 0.05 to 0.30% V as optional additional elements in addition to the essential elements may be used for the core material in the first embodiment, the second embodiment and the second aspect of the third embodiment.

Furthermore, besides the essential elements and the optional additional elements, unavoidable impurities may be comprised each in an amount of 0.05% or less and in a total amount of 0.15%.

As the aluminum alloy used for the core material of the invention, Al—Mn-based alloys such as JIS 3000 series alloys including JIS 3003 alloy and the like for example are preferably used. Each component is explained below.

Si:

Si forms an Al—Fe—Mn—Si-based intermetallic compound with Fe and Mn and improves the strength of the core material through dispersion strengthening or improves the strength of the core material through solid solution strengthening by diffusing into the aluminum parent phase to forma solid solution. The Si content is 0.05 to 1.50%. For a content less than 0.05%, use of high purity aluminum metal is required, resulting in high cost. On the other hand, when the content exceeds 1.50%, the melting point of the core material decreases, and the core material is more likely to melt during brazing. A preferable Si content is 0.10 to 1.20%.

Fe:

Fe forms an Al—Fe—Mn—Si-based intermetallic compound with Si and Mn and improves the strength of the core material through dispersion strengthening. The Fe content is 0.05 to 2.00%. For a content less than 0.05%, use of high purity aluminum metal is required, resulting in high cost. On the other hand, when the content exceeds 2.00%, a giant intermetallic compound tends to be formed during casting, and the plasticity deteriorates. A preferable Fe content is 0.10 to 1.50%.

Mn:

Mn forms an Al—Fe—Mn—Si-based intermetallic compound with Si and Fe and improves the strength of the core material through dispersion strengthening or improves the strength of the core material through solid solution strengthening by diffusing into the aluminum parent phase to forma solid solution. The Mn content is 0.50 to 2.00%. When the content is less than 0.50%, the effects are insufficient, while when the content exceeds 2.00%, a giant intermetallic compound tends to be formed during casting, and the plasticity deteriorates. A preferable Mn content is 0.80 to 1.80%.

Cu:

Cu may be comprised because Cu improves the strength of the core material through solid solution strengthening. The Cu content is 0.05 to 1.50%. When the content is less than 0.05%, the effect is insufficient, while when the content exceeds 1.50%, the aluminum alloy is more likely to crack during casting. A preferable Cu content is 0.30 to 1.00%.

Mg:

Mg may be comprised because precipitation of $Mg_2Si$ improves the strength of the core material. The Mg content is 0.05 to 0.50%. When the content is less than 0.05%, the effect is insufficient, while when the content exceeds 0.50%, brazing becomes difficult due to the deterioration of the flux or the like. A preferable Mg content is 0.10 to 0.40%.

Ti:

Ti may be comprised because Ti improves the strength of the core material through solid solution strengthening. The Ti content is 0.05 to 0.30%. When the content is less than 0.05%, the effect is insufficient. When the content exceeds 0.30%, a giant intermetallic compound tends to be formed, and the plasticity deteriorates. A preferable Ti content is 0.10 to 0.20%.

Zr:

Zr may be comprised because Zr has effects of improving the strength of the core material through solid solution strengthening and coarsening the crystal grains after braze heating by precipitation of an Al—Zr-based intermetallic compound. The Zr content is 0.05 to 0.30%. When the content is less than 0.05%, the effects cannot be obtained. On the other hand, when the content exceeds 0.30%, a giant intermetallic compound tends to be formed, and the plasticity deteriorates. A preferable Zr content is 0.10 to 0.20%.

Cr:

Cr may be comprised because Cr has effects of improving the strength of the core material through solid solution strengthening and coarsening the crystal grains after braze heating by precipitation of an Al—Cr-based intermetallic compound. The Cr content is 0.05 to 0.30%. When the content is less than 0.05%, the effects cannot be obtained. On the other hand, when the content exceeds 0.30%, a giant intermetallic compound tends to be formed, and the plasticity deteriorates. A preferable Cr content is 0.10 to 0.20%.

V:

V may be comprised because V improves the strength of the core material through solid solution strengthening and also improves the corrosion resistance. The V content is 0.05 to 0.30%. When the content is less than 0.05%, the effects cannot be obtained. On the other hand, when the content exceeds 0.30%, a giant intermetallic compound tends to be formed, and the plasticity deteriorates. A preferable V content is 0.10 to 0.20%.

At least one of the elements Cu, Mg, Ti, Zr, Cr and V may be added to the core material when needed.

An aluminum alloy comprising, as essential elements, Si, Fe and Mn in the contents of the first and second embodiments and the second aspect of the third embodiment as well as 0.05 to 0.50% Mg, which is an optional additional element in the embodiments and the aspect, and a balance of Al and unavoidable impurities is used for the core material of the first aspect of the third embodiment. Accordingly, in the core material of the first aspect of the third embodiment, Mg is not an optional additional element. The optional additional elements except for Mg are the same elements as those of the first and second embodiments and the second aspect of the third embodiment and the contents thereof are also the same.

3. Sacrificial Anode Material

In the first and second embodiments and the third embodiment (the first aspect and the second aspect), an aluminum alloy comprising 0.50 to 8.00% Zn, 0.05 to 1.50% Si and 0.05 to 2.00% Fe as essential elements and a balance of Al and unavoidable impurities is used for the sacrificial anode material.

An aluminum alloy which contains one, two or more selected from 0.05 to 2.00% Ni, 0.05 to 2.00% Mn, 0.05 to 3.00% Mg, 0.05 to 0.30% Ti, 0.05 to 0.30% Zr, 0.05 to 0.30 mass % Cr and 0.05 to 0.30 mass % V as optional additional elements in addition to the essential elements may be used for the sacrificial anode material. Furthermore, besides the essential elements and the optional additional elements, unavoidable impurities may be comprised each in an amount of 0.05% or less and in a total amount of 0.15%. Each component is explained below.

Zn:

Zn can shift the pitting potential in the less noble direction and can improve the corrosion resistance through sacrificial anticorrosion effect by generating a potential difference from the core material. The Zn content is 0.50 to 8.00%. When the content is less than 0.50%, the effect of improving the corrosion resistance through the sacrificial anticorrosion effect cannot be obtained sufficiently. On the other hand, when the content exceeds 8.00%, the corrosion rate increases, and the sacrificial anode material is lost at an early stage, resulting in the deterioration of the corrosion resistance. A preferable Zn content is 1.00 to 6.00%.

Si:

Si forms an Al—Fe—Si-based intermetallic compound with Fe and forms an Al—Fe—Mn—Si-based intermetallic compound with Fe and Mn when Mn is comprised at the same time. Si thus improves the strength of the sacrificial anode material through dispersion strengthening or improves the strength of the sacrificial anode material through solid solution strengthening by diffusing into the aluminum parent phase to form a solid solution. On the other hand, since Si shifts the potential of the sacrificial anode material in the more noble direction, Si inhibits the sacrificial anticorrosion effect and deteriorates the corrosion resistance. The Si content is 0.05 to 1.50%. For a content less than 0.05%, use of high purity aluminum metal is required, resulting in high cost. On the other hand, when the content exceeds 1.50%, the pitting potential of the sacrificial anode material is shifted in the more noble direction, and the sacrificial anticorrosion effect is lost, resulting in the deterioration of the corrosion resistance. A preferable Si content is 0.10 to 1.20%.

Fe:

Fe forms an Al—Fe—Si-based intermetallic compound with Si and forms an Al—Fe—Mn—Si-based intermetallic compound with Si and Mn when Mn is contained at the same time. Fe thus improves the strength of the sacrificial anode material through dispersion strengthening. The amount of Fe is 0.05 to 2.00%. For a content less than 0.05%, use of high purity aluminum metal is required, resulting in high cost. On the other hand, when the content exceeds 2.00%, a giant intermetallic compound tends to be formed during casting, and the plasticity deteriorates. A preferable Fe content is 0.10 to 1.50%.

Ni:

Ni forms an Al—Ni-based intermetallic compound or an Al—Fe—Ni-based intermetallic compound with Fe. The intermetallic compounds have significantly noble corrosion potential as compared to the aluminum matrix and thus act as cathode sites of corrosion. Accordingly, when the intermetallic compounds are dispersed in the sacrificial anode material, the sites for the onset of corrosion are dispersed, and the corrosion in the depth direction is unlikely to progress, resulting in the improvement of the corrosion resistance. Thus, Ni may be comprised. The Ni content is 0.05 to 2.00%. When the content is less than 0.05%, the effects cannot be obtained sufficiently. On the other hand, when the content exceeds 2.00%, a giant intermetallic compound tends to be formed during casting, and the plasticity deteriorates. A preferable Ni content is 0.10 to 1.50%.

Mn:

Mn may be comprised because Mn improves the strength of the sacrificial anode material and the corrosion resistance. The Mn content is 0.05 to 2.00%. When the content exceeds 2.00%, a giant intermetallic compound tends to be formed during casting, and the plasticity deteriorates. On the other hand, when the content is less than 0.05%, the effects cannot be obtained sufficiently. A preferable Mn content is 0.05 to 1.80%.

Mg:

Mg may be comprised because precipitation of $Mg_2Si$ improves the strength of the sacrificial anode material. In addition, not only the strength of the sacrificial anode material itself but also the strength of the core material is improved because Mg diffuses into the core material from the sacrificial anode material by brazing. For the reasons, Mg may be comprised. The Mg content is 0.05 to 3.00%. When the content is less than 0.05%, the effects cannot be obtained sufficiently. On the other hand, when the content exceeds 3.00%, pressure bonding of the sacrificial anode material and the core material becomes difficult in the hot clad rolling step. A preferable Mg content is 0.10 to 2.00%. Since Mg deteriorates the flux during Nocolok brazing and inhibits the brazing property, Nocolok brazing cannot be employed for joining parts of a tube material when the sacrificial anode material comprises Mg in an amount of 0.5% or more. In this case, it is necessary to use means such as welding for example for joining parts of a tube material.

Ti

Ti may be comprised because Ti improves the strength of the sacrificial anode material through solid solution strengthening and also improves the corrosion resistance. The Ti content is 0.05 to 0.30%. When the content is less than 0.05%, the effects cannot be obtained. When the content exceeds 0.30%, a giant intermetallic compound tends to be formed, and the plasticity deteriorates. A preferable Ti content is 0.05 to 0.20%.

Zr

Zr may be comprised because Zr has effects of improving the strength of the sacrificial anode material through solid solution strengthening and coarsening the crystal grains after braze heating by precipitation of an Al—Zr-based intermetallic compound. The Zr content is 0.05 to 0.30%. When the content is less than 0.05%, the effects cannot be obtained. On the other hand, when the content exceeds 0.30%, a giant intermetallic compound tends to be formed, and the plasticity deteriorates. A preferable Zr content is 0.10 to 0.20%.

Cr:

Cr may be comprised because Cr has effects of improving the strength of the sacrificial anode material through solid solution strengthening and coarsening the crystal grains after braze heating by precipitation of an Al—Cr-based intermetallic compound. The Cr content is 0.05 to 0.30%. When the content is less than 0.05%, the effects cannot be obtained. When the content exceeds 0.30%, a giant intermetallic compound tends to be formed, and the plasticity deteriorates. A preferable Cr content is 0.10 to 0.20%.

V:

V may be comprised because V improves the strength of the sacrificial anode material through solid solution strengthening and also improves the corrosion resistance. The V content is 0.05 to 0.30%. When the content is less than 0.05%, the effects cannot be obtained. When the content exceeds 0.30%, a giant intermetallic compound tends to be formed, and the plasticity deteriorates. A preferable V content is 0.05 to 0.20%.

At least one of the elements Ni, Mn, Mg, Ti, Zr, Cr and V may be added to the sacrificial anode material when needed.

4. Brazing Filler Metal

In the second embodiment and the third embodiment (the first aspect and the second aspect), an aluminum alloy containing 2.50 to 13.00% Si and 0.05 to 1.20% Fe as essential elements and a balance of Al and unavoidable impurities is used for the brazing filler metal.

An aluminum alloy which contains one, two or more selected from 0.50 to 8.00% Zn, 0.05 to 1.50% Cu, 0.05 to 2.00% Mn, 0.05 to 0.30% Ti, 0.05 to 0.30% Zr, 0.05 to 0.30% Cr, 0.05 to 0.30% V, 0.001 to 0.050% Na and 0.001 to 0.050% Sr as optional additional elements in addition to the essential elements may be used for the brazing filler metal. Furthermore, besides the essential elements and the optional additional elements, unavoidable impurities may be contained each in an amount of 0.05% or less and in a total amount of 0.15%. Each component is explained below.

Si:

The addition of Si decreases the melting point of the brazing filler metal and generates a liquid phase, and thus brazing becomes possible. The Si content is 2.50 to 13.00%. When the content is less than 2.50%, only a small amount of liquid phase is generated, and brazing is unlikely to function. On the other hand, when the content exceeds 13.00%, the amount of Si which diffuses into the material to be brazed such as a fin becomes excessive in the case where the brazing filler metal is used for a tube material for example, and the material to be brazed melts. A preferable Si content is 3.50 to 12.00%.

Fe:

Since Fe tends to form an Al—Fe-based or Al—Fe—Si-based intermetallic compound, Fe decreases the effective Si amount for brazing and deteriorates the brazing property. The Fe content is 0.05 to 1.20%. For a content less than 0.05%, use of high purity aluminum metal is required, resulting in high cost. On the other hand, when the content exceeds 1.20%, the effective Si amount for brazing decreases, and brazing becomes insufficient. A preferable Fe content is 0.10 to 0.50%.

Zn:

Zn may be comprised because Zn can shift the pitting potential in the less noble direction and can improve the corrosion resistance through sacrificial anticorrosion effect by generating a potential difference from the core material. The Zn content is 0.50 to 8.00%. When the content is less than 0.5%, the effect of improving the corrosion resistance through the sacrificial anticorrosion effect cannot be obtained sufficiently. On the other hand, when the content exceeds 8.00%, the corrosion rate increases, and the sacrificial anode material is lost at an early stage, resulting in the deterioration of the corrosion resistance. A preferable Zn content is 1.00 to 6.00%.

Cu:

Cu may be comprised because Cu improves the strength of the brazing filler metal through solid solution strengthening. The Cu content is 0.05 to 1.50%. When the content is less than 0.05%, the effect is insufficient, while when the content exceeds 1.50%, the aluminum alloy is more likely to crack during casting. A preferable Cu content is 0.30 to 1.00%.

Mn:

Mn may be comprised because Mn improves the strength of the brazing filler metal and the corrosion resistance. The Mn content is 0.05 to 2.00%. When the content exceeds 2.00%, a giant intermetallic compound tends to be formed during casting, and the plasticity deteriorates. On the other hand, when the content is less than 0.05%, the effects cannot be obtained sufficiently. A preferable Mn content is 0.05 to 1.80%.

Ti:

Ti may be comprised because Ti improves the strength of the brazing filler metal through solid solution strengthening and also improves the corrosion resistance. The Ti content is 0.05 to 0.30%. When the content is less than 0.05%, the effects cannot be obtained. When the content exceeds 0.30%, a giant intermetallic compound tends to be formed, and the plasticity deteriorates. A preferable Ti content is 0.10 to 0.20%.

Zr:

Zr may be comprised because Zr has effects of improving the strength of the brazing filler metal through solid solution strengthening and coarsening the crystal grains after braze heating by precipitation of an Al—Zr-based intermetallic compound. The Zr content is 0.05 to 0.30%. When the content is less than 0.05%, the effects cannot be obtained. When the content exceeds 0.30%, a giant intermetallic compound tends to be formed, and the plasticity deteriorates. A preferable Zr content is 0.10 to 0.20%.

Cr:

Cr may be comprised because Cr has effects of improving the strength of the brazing filler metal through solid solution strengthening and coarsening the crystal grains after braze heating by precipitation of an Al—Cr-based intermetallic compound. The Cr content is 0.05 to 0.30%. When the content is less than 0.05%, the effects cannot be obtained. When the content exceeds 0.30%, a giant intermetallic compound tends to be formed, and the plasticity deteriorates. A preferable Cr content is 0.10 to 0.20%.

V:

V may be comprised because V improves the strength of the brazing filler metal through solid solution strengthening and also improves the corrosion resistance. The V content is 0.05 to 0.30%. When the content is less than 0.05%, the effects cannot be obtained. When the content exceeds 0.30%, a giant intermetallic compound tends to be formed, and the plasticity deteriorates. A preferable V content is 0.10 to 0.20%.

Na and Sr:

Na and Sr exhibit an effect of making the Si grains in the brazing filler metal fine. The Na and Sr contents are 0.001 to 0.050%. When the contents are less than 0.001%, the effect cannot be obtained sufficiently. On the other hand, when the contents exceed 0.050%, the oxide layer becomes thick, and the brazing property deteriorates. The contents are preferably 0.003 to 0.020%.

At least one of the elements Zn, Cu, Mn, Ti, Zr, Cr, V, Na and Sr may be added to the brazing filler metal when needed.

5. Intermediate Layer Material

An aluminum alloy containing 0.05 to 1.50% Si and 0.05 to 2.00% Fe as essential elements and a balance of Al and unavoidable impurities is used for the intermediate layer material in the first aspect of the third embodiment.

An aluminum alloy which further contains one, two or more selected from 0.50 to 8.00% Zn, 0.05 to 2.00% Mn, 0.05 to 1.50% Cu, 0.05 to 0.30% Ti, 0.05 to 0.30% Zr, 0.05 to 0.30% Cr and 0.05 to 0.30% V as optional additional elements may be used for the intermediate layer material in the first aspect of the third embodiment.

Furthermore, besides the essential elements and the optional additional elements, unavoidable impurities may be contained each in an amount of 0.05% or less and in a total amount of 0.15%. Each component is explained below.

Si:

Si forms an Al—Fe—Si-based intermetallic compound with Fe and forms an Al—Fe—Mn—Si-based intermetallic compound with Fe and Mn when Mn is comprised at the same time. Si thus improves the strength of the intermediate layer material through dispersion strengthening or improves the strength of the intermediate layer material through solid solution strengthening by diffusing into the aluminum parent phase to form a solid solution. The Si content is 0.05 to 1.50%. For a content less than 0.05%, use of high purity aluminum metal is required, resulting in high cost. On the other hand, when the content exceeds 1.50%, the intermediate layer material is more likely to melt during brazing due to the decrease of the melting point. A preferable Si content is 0.10 to 1.20%.

Fe:

Fe forms an Al—Fe—Si-based intermetallic compound with Si and forms an Al—Fe—Mn—Si-based intermetallic compound with Si and Mn when Mn is contained at the same time. Fe thus improves the strength of the intermediate layer material through dispersion strengthening. The amount of Fe is 0.05 to 2.00%. For a content less than 0.05%, use of high purity aluminum metal is required, resulting in high cost. On the other hand, when the content exceeds 2.00%, a giant intermetallic compound tends to be formed during casting, and the plasticity deteriorates. A preferable Fe content is 0.10 to 1.50% or less.

Zn:

Zn diffuses to the surface of the brazing filler metal during braze heating and can shift the pitting potential on the brazing filler metal surface after braze heating in the less noble direction. Zn can thus improve the corrosion resistance through sacrificial anticorrosion effect by generating a potential difference between the brazing filler metal surface and the core material. Thus, Zn may be comprised. The Zn content is 0.50 to 8.00%. When the content is less than 0.50%, the effect of improving the corrosion resistance through the sacrificial anticorrosion effect cannot be obtained sufficiently. On the other hand, when the content exceeds 8.00%, the corrosion rate increases, and the sacrificial anode material is lost at an early stage, resulting in the deterioration of the corrosion resistance. A preferable Zn content is 1.00 to 6.00%.

Mn:

Mn may be comprised because Mn forms an Al—Mn—Si-based intermetallic compound with Si and improves the strength of the intermediate layer material through dispersion strengthening or improves the strength of the intermediate layer material through solid solution strengthening by diffusing into the aluminum parent phase to forma solid solution. The Mn content is 0.05 to 2.00%. When the content is less than 0.05%, the effects are insufficient, while when the content exceeds 2.00%, a giant intermetallic compound tends to be formed during casting, and the plasticity deteriorates. A preferable Mn content is 0.10 to 1.80%.

Cu:

Cu may be comprised because Cu improves the strength of the intermediate layer material through solid solution strengthening. The Cu content is 0.05 to 1.50%. When the content is less than 0.05%, the effect is insufficient, while when the content exceeds 1.50%, the aluminum alloy is more likely to crack during casting. A preferable Cu content is 0.30 to 1.00%.

Ti:

Ti may be comprised because Ti improves the strength of the intermediate layer material through solid solution strengthening and also improves the corrosion resistance. The Ti content is 0.05 to 0.30%. When the content is less than 0.05%, the effects cannot be obtained. When the content exceeds 0.30%, a giant intermetallic compound tends to be formed, and the plasticity deteriorates. A preferable Ti content is 0.05 to 0.20%.

Zr:

Zr may be comprised because Zr has effects of improving the strength of the intermediate layer material through solid solution strengthening and coarsening the crystal grains after braze heating by precipitation of an Al—Zr-based intermetallic compound. The Zr content is 0.05 to 0.30%. When the content is less than 0.05%, the effects cannot be obtained. When the content exceeds 0.30%, a giant intermetallic compound tends to be formed, and the plasticity deteriorates. A preferable Zr content is 0.10 to 0.20%.

Cr

Cr may be comprised because Cr has effects of improving the strength of the intermediate layer material through solid solution strengthening and coarsening the crystal grains after braze heating by precipitation of an Al—Cr-based intermetallic compound. The Cr content is 0.05 to 0.30%. When the content is less than 0.05%, the effects cannot be obtained. When the content exceeds 0.30%, a giant intermetallic compound tends to be formed, and the plasticity deteriorates. A preferable Cr content is 0.10 to 0.20%.

V:

V may be comprised because V improves the strength of the intermediate layer material through solid solution strengthening and also improves the corrosion resistance. The V content is 0.05 to 0.30%. When the content is less than 0.05%, the effects cannot be obtained. When the content exceeds 0.30%, a giant intermetallic compound tends to be formed, and the plasticity deteriorates. A preferable V content is 0.05 to 0.2%.

At least one of the elements Zn, Mn, Cu, Ti, Zr, Cr and V may be added to the intermediate layer material when needed.

An aluminum alloy containing, as essential elements, Si and Fe in the contents of the first aspect as well as 0.50 to 8.00% Zn, which is an optional additional element in the first aspect, and a balance of Al and unavoidable impurities is used for the intermediate layer material of the second aspect of the third embodiment. Accordingly, in the intermediate layer material of the second aspect, Zn is not an optional additional element. The optional additional elements except for Zn are the same elements as those of the first aspect and the contents thereof are also the same.

6. Effects of Intermediate Layer Material

In the second aspect of the third embodiment, the intermediate layer material contains Zn as an essential element. In this case, sacrificial anticorrosion effect can be given to the surface at the brazing filler metal side by Zn which has diffused to the brazing filler metal surface during brazing or Zn in the intermediate layer material itself. On the other hand, in the first aspect of the third embodiment, the core material contains Mg as an essential element. In this case, although the Mg component inhibits the brazing property, the diffusion of Mg in the core material to the brazing filler metal surface is prevented during brazing by cladding the intermediate layer material, and thus the degree of deterioration of the brazing property can be reduced.

7. Grain size of Sacrificial Anode Material

In the aluminum alloy clad material of the invention, the grain size of the sacrificial anode material before braze heating is controlled to 60 μm or more. This is to improve the corrosion resistance of the sacrificial anode material after braze heating. As shown in FIG. 1, the grain size here means the equivalent circle diameter of a crystal grain, where the crystal grain is an area surrounded by grain boundaries when the rolled surface of the sacrificial anode material is observed. A grain boundary is a boundary with a difference between the neighboring crystal orientations of 20 degrees or more. The method for measuring the grain size is not particularly restricted, but electron backscatter diffraction (EBSD) is generally used. The reasons for the restriction are explained below.

The sacrificial anode material is clad in the clad material for the purpose of sacrificial anticorrosion. By corroding the sacrificial anode material first, the corrosion of the clad material is made to spread on the plane of the sacrificial anode material. As a result, corrosion perforation of a tube made of the clad material for example is prevented. When the corrosion rate of the sacrificial anode material is high, however, the sacrificial anode material is lost at an early stage, and the sacrificial anticorrosion effect is lost, leading to corrosion perforation of the tube.

As a result of intensive studies, the inventors have found that the corrosion rate at the crystal grain boundaries in the sacrificial anode material is higher than that in the crystal grains and that the corrosion rate can be restricted by decreasing the area of the crystal grain boundaries. To decrease the area of the crystal grain boundaries means to increase the grain size. Upon investigation in further detail, it has been found that the corrosion rate of the sacrificial anode material is restricted and the aluminum alloy clad material has excellent corrosion resistance when the grain size of the sacrificial anode material is 100 μm or more after braze heating. When the grain size of the sacrificial anode material is less than 100 μm after braze heating, the corrosion rate of the sacrificial anode material is high, and the sacrificial anticorrosion effect is lost at an early stage. Thus, effective corrosion resistance cannot be obtained. The grain size of the sacrificial anode material after braze heating is preferably 120 μm or more. The upper limit of the grain size of the sacrificial anode material after braze heating is not particularly restricted, but a value of 1000 μm or more is difficult to achieve.

The inventors have further investigated and found a correlation between the grain size of the sacrificial anode material before braze heating and the grain size of the sacrificial anode material after braze heating. That is, in order to obtain a sacrificial anode material with a large grain size after braze heating, it is necessary that the grain size of the sacrificial anode material before braze heating is large. As a result of further investigation into this point, it has been found that the grain size of the sacrificial anode material after braze heating becomes 100 μm or more when the grain size of the sacrificial anode material before braze heating is 60 μm or more. When the grain size of the sacrificial anode material before braze heating is less than 60 μm, the grain size of the sacrificial anode material after braze heating becomes less than 100 μm. In this regard, the grain size before braze heating is preferably 80 μm or more. The upper limit of the grain size of the sacrificial anode material before braze heating is not particularly restricted, but a value of 1000 μm or more is difficult to achieve.

8. Grain size of Core Material

Figure 2:
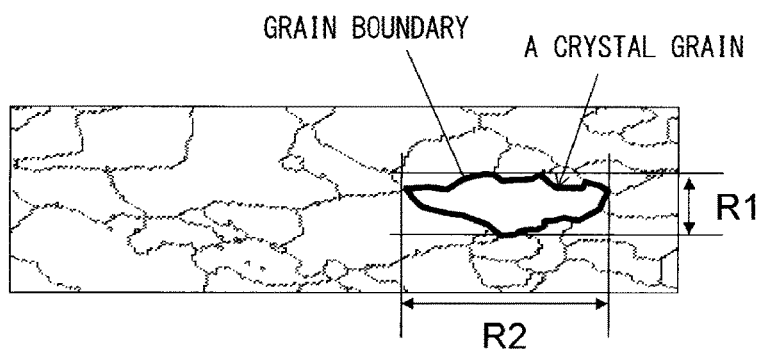
FIG. 2 A schematic figure illustrating a grain size R1 in the thickness direction and a grain size R2 in the rolling direction in a cross section of a core material along the rolling direction.
Figure 3:
FIG. 3 A polarized light microscopic image of a cross section along the rolling direction where a core material having a fibrous structure was subjected to anodic oxidation.

In the aluminum alloy clad material of the invention, the ratio R1/R2 is restricted to 0.30 or less, where R1 (μm) is the grain size in the thickness direction and R2 (μm) is the grain size in the rolling direction in a cross section of the core material along the rolling direction before braze heating. The ratio is an index to improve the formability of the clad material before braze heating. As shown in FIG. 2, the grain sizes R1 and R2 (μm) here are defined as the maximum diameter of a crystal grain in the thickness direction and the maximum diameter in the rolling direction, respectively, where the crystal grain is an area surrounded by grain boundaries when a cross section along the rolling direction of the clad material is observed. A grain boundary is a boundary with a difference between the neighboring crystal orientations of 20 degrees or more. The method for measuring the grain sizes is not particularly restricted, but electron backscatter diffraction (EBSD) is generally used. In this regard, in the case where the degree of processing of the core material is very high, a fibrous structure like the structure shown in FIG. 3 is observed when the core material is subjected to anodic oxidation after mirror polishing and the surface subjected to the anodic oxidation is observed using a polarized light microscope. In such a case, the crystal grains are completely crushed flat in the thickness direction, and this case is defined as R1=0.

As already described above, so far, the formability of an aluminum alloy has been improved by adjusting the mechanical properties by the refining type determined by the conditions of process annealing or the reduction in a subsequent step. However, when a step such as bending under severe conditions is conducted, the material cracks. The inventors have conducted intensive studies and as a result found that excellent formability can be obtained when the crystal grains of the core material before braze heating are flat in the rolling direction in a cross section along the rolling direction. In the invention, the ratio R1/R2 is used as an index of the flatness of the crystal grains. Upon investigation in detail by the inventors, it has been found that the crystal grains of the core material are flat enough and excellent formability is exhibited when the ratio R1/R2 is 0.30 or less. When the ratio R1/R2 exceeds 0.30, the flatness of the crystal grains of the core material is insufficient, and excellent processability cannot be achieved. The ratio R1/R2 is preferably 0.20 or less. The ratio R1/R2 is preferably small, because the degree of flatness becomes higher and the processability becomes better. As described above, the ratio R1/R2 may be 0 with R1=0.

9. Production Method of Aluminum Alloy Clad Material
9-1. Embodiments of Production Method The method for producing the aluminum alloy clad material of the first embodiment according to the invention includes a step of casting the aluminum alloys for the core material and the sacrificial anode material, a hot rolling step of hot rolling the cast sacrificial anode material ingot to a predetermined thickness, a cladding step of cladding the sacrificial anode material rolled to the predetermined thickness on at least one surface of the core material ingot and thus obtaining a clad material, a hot clad rolling step of hot rolling the clad material, a cold rolling step of cold rolling the hot-rolled clad material and one or more annealing steps of annealing the clad material either during or after the cold rolling step or both during and after the cold rolling step.

The method for producing the aluminum alloy clad material of the second embodiment according to the invention includes a step of casting the aluminum alloys for the core material, the sacrificial anode material and the brazing filler metal, a hot rolling step of hot rolling the cast sacrificial anode material ingot and the cast brazing filler metal ingot to predetermined thicknesses, a cladding step of cladding the sacrificial anode material rolled to the predetermined thickness on a surface of the core material ingot, cladding the brazing filler metal rolled to the predetermined thickness on the other surface and thus obtaining a clad material, a hot clad rolling step of hot rolling the clad material, a cold rolling step of cold rolling the hot-rolled clad material and one or more annealing steps of annealing the clad material either during or after the cold rolling step or both during and after the cold rolling step.

The method for producing the aluminum alloy clad material of the third embodiment according to the invention includes a step of casting the aluminum alloys for the core material, the intermediate layer material, the sacrificial anode material and the brazing filler metal, a hot rolling step of hot rolling the cast intermediate layer material ingot, the cast brazing filler metal ingot and the cast sacrificial anode material ingot to predetermined thicknesses, a cladding step of cladding the intermediate layer material rolled to the predetermined thickness on a surface of the core material ingot, cladding the brazing filler metal rolled to the predetermined thickness on the surface of the intermediate layer material, wherein the surface is not the core material side, cladding the sacrificial anode material rolled to the predetermined thickness on the other surface of the core material ingot and thus obtaining a clad material, a hot clad rolling step of hot rolling the clad material, a cold rolling step of cold rolling the hot-rolled clad material and one or more annealing steps of annealing the clad material either during or after the cold rolling step or both during and after the cold rolling step.

9-2. Casting Step and Hot Rolling Step

The conditions of the step of casting the core material, the sacrificial anode material, the brazing filler metal and the intermediate layer material are not particularly restricted, but in general, water-cooled semi-continuous casting is employed. In the step of hot rolling the sacrificial anode material, the brazing filler metal and the intermediate layer material to the predetermined thicknesses, the heating conditions are preferably a temperature of 400 to 560° C. and a period of 1 to 10 hours. When the temperature is lower than 400° C., the plasticity is poor, and edge cracking or the like may be caused during rolling. In the case of a high temperature exceeding 560° C., the ingots may melt during heating. When the heating time is shorter than one hour, since the temperatures of the ingots become uneven, the plasticity is poor, and edge cracking or the like may be caused during rolling. When the heating time exceeds 10 hours, the productivity deteriorates notably.

9-3. Hot Clad Rolling Step

During the methods for producing the aluminum alloy clad materials of the first to third embodiments, in the hot clad rolling step, the rolling start temperature is 400 to 520° C., and the number of rolling passes each with a rolling reduction of 30% or more is restricted to five or less while the temperature of the clad material is 200 to 400° C. The hot clad rolling step may be divided into a rough rolling step and a finish rolling step. In the finish rolling step, a reversing or tandem rolling mill is used. In a reversing rolling mill, a pass is defined as a one-way rolling, and in a tandem rolling mill, a pass is defined as rolling with a set of rolls.

First, the rolling pass is explained. As already described above, in the aluminum alloy clad material of the invention, it is necessary to increase the grain size of the sacrificial anode material before braze heating. The crystal grains of the sacrificial anode material are formed in an annealing step during the production, and as the strain accumulated in the sacrificial anode material before annealing becomes greater, the driving force for the grain growth generated during annealing becomes larger, and larger crystal grains can be obtained. On the other hand, in the aluminum alloy clad material of the invention, it is necessary that the crystal grains of the core material are flat before braze heating. The crystal grains of the core material are also formed in an annealing step during the production. As the strain accumulated in the core material before annealing becomes smaller, the driving force for the grain growth in the thickness direction generated during annealing becomes smaller, and as a result, flat crystal grains can be obtained.

That is, to increase the size of the crystal grains of the sacrificial anode material and to flatten the crystal grains of the core material are incompatible. Accordingly, it has been difficult with the conventional techniques to achieve both. However, as a result of intensive studies, the inventors have found that both can be achieved by controlling the hot clad rolling step.

When a rolling pass with a large rolling reduction is conducted while the temperature of the hot clad rolling is relatively low, larger shear strain tends to be caused also in the center of the material. More specifically, in the hot clad rolling step, when the number of rolling passes with a rolling reduction of 30% or more is restricted to five or less while the temperature of the clad material is 200 to 400° C., the shear strain caused in the core material becomes small, and the crystal grains of the core material before braze heating can be made flat. While the temperature of the clad material is higher than 400° C. in the hot clad rolling step, dynamic recovery occurs during the hot clad rolling, and the shear strain caused in the core material does not become large even by a rolling pass with a rolling reduction of 30% or more. Thus, the flatness of the crystal grains of the core material is not affected. On the other hand, when the temperature of the clad material is lower than 200° C. in the hot clad rolling step, cracking occurs during the hot rolling, and a clad material cannot be produced. Also, when the rolling reduction is less than 30% per pass, the shear strain caused in the core material does not become large, and the flatness of the crystal grains of the core material is not affected. The number of rolling passes with a rolling reduction of 30% or more is preferably four or less while the temperature of the clad material is 200 to 400° C. The rolling reduction is preferably 35% or more. When a rolling pass with a rolling reduction exceeding 50% is applied, cracking of the material or the like may occur.

On the other hand, even when the number of rolling passes with a rolling reduction of 30% or more is restricted to five or less while the temperature of the clad material is 200 to 400° C. in the hot clad rolling step, large shear strain is caused in the sacrificial anode material, which is close to the surface layer of the clad material. Thus, grains grow sufficiently in the sacrificial anode material during process annealing, and large crystal grains can be formed in the sacrificial anode material. That is, by the control in the hot clad rolling, the crystal grains of the sacrificial anode material can be coarsened and the crystal grains of the core material can be made flat.

Next, the rolling start temperature is explained. The grain size of the sacrificial anode material before braze heating is controlled by adjusting the rolling start temperature in the hot clad rolling step. When the start temperature of the hot clad rolling is 520° C. or lower, large shear strain is caused in the sacrificial anode material during the hot clad rolling, and the grain size of the sacrificial anode material before braze heating can be increased. When the start temperature of the hot clad rolling exceeds 520° C., dynamic recovery occurs in the sacrificial anode material during the hot clad rolling, and the shear strain becomes smaller. Thus, the grain size of the sacrificial anode material before braze heating cannot be increased. On the other hand, when the material temperature is lower than 400° C. at the start of the hot clad rolling, the material cracks during rolling. Thus, the start temperature of the hot clad rolling is 400 to 520° C. The start temperature of the hot clad rolling is preferably 420 to 500° C. or lower.

In the hot clad rolling step, the lower limit is not particularly set for the number of the passes with a rolling reduction of 30% or more conducted while the temperature of the clad material is 200 to 400° C. However, when no pass with a rolling reduction of 30% or more is included, many passes with a rolling reduction less than 30% are required to obtain the desired effects, and the productivity deteriorates. Accordingly, it is preferable that one or more passes with a rolling reduction of 30% or more are included. Moreover, the clad material is preferably heated at 400 to 560° C. for 1 to 10 hours before the hot clad rolling. When the heating temperature is lower than 400° C., the material temperature during rolling becomes too low, and thus the material may crack during rolling. On the other hand, when the heating temperature exceeds 560° C., the brazing filler metal may melt. When the heating time is shorter than one hour, the material temperature is unlikely to become even. On the other hand, when the heating time exceeds 10 hours, the productivity may deteriorate notably. The thickness after the hot clad rolling is not particularly restricted, but in general, a thickness of around 2.0 to 5.0 mm is preferable.

9-4. Annealing Step

In the methods for producing the aluminum alloy clad materials of the first to third embodiments, one or more annealing steps of annealing the clad material either during or after the cold rolling step or both during and after the cold rolling step are conducted. Specifically, (1) one or more process annealing steps are conducted during the cold rolling step; (2) one final annealing step is conducted after the cold rolling step; or (3) (1) and (2) are conducted. In the annealing steps, the clad material is held at 200 to 560° C. for 1 to 10 hours.

The annealing steps are conducted for the purpose of adjusting the strain of the material, and by the steps, the sacrificial anode material can be recrystallized, and large crystal grains as those described above can be obtained. When the temperature of the clad material is lower than 200° C. in the annealing steps or when the holding time is shorter than one hour, the recrystallization of the sacrificial anode material is not completed. When the annealing temperature exceeds 560° C., the brazing filler metal may melt. Even when the holding time exceeds 10 hours, there is no problem with the properties of the clad material, but the productivity deteriorates notably.

The upper limit of the number of the annealing steps is not particularly restricted, but the number is preferably three or less in order to avoid the increase of costs due to the increased number of steps.

9-5. Homogenization Step

The ingot obtained by casting the aluminum alloy core material may be subjected to a homogenization step before the cladding step. In the homogenization step, the ingot is preferably held at 450 to 620° C. for 1 to 20 hours. When the temperature is lower than 450° C. or when the holding time is shorter than one hour, the homogenization effect may be insufficient, while the core material ingot may melt when the temperature exceeds 620° C. Also, when the holding time exceeds 20 hours, the homogenization effect is saturated, and the step is an uneconomic step.

9-6. Cladding Rate

In the aluminum alloy clad material of the invention, the cladding rate of the sacrificial anode material (one surface) is preferably 3 to 25%. As described above, during the hot clad rolling step in the production steps, it is necessary that large shear strain is caused only in the sacrificial anode material. However, when the cladding rate of the sacrificial anode material exceeds 25%, sufficient shear strain cannot be caused in the entire sacrificial anode material, and in some cases, the sacrificial anode material cannot entirely be recrystallized. On the other hand, when the cladding rate of the sacrificial anode material is less than 3%, the sacrificial anode material is too thin, and thus the sacrificial anode material cannot always be clad on the entire surface of the core material in the hot clad rolling. The cladding rate of the sacrificial anode material is more preferably 5 to 20%.

The cladding rates of the brazing filler metal and the intermediate layer material are not particularly restricted, but the brazing filler metal and the intermediate layer material are generally clad with cladding rates of around 3 to 30%.

10. Heat Exchanger

The aluminum alloy clad material is preferably used as a part of a heat exchanger such as a tube material and a header plate and in particular as a tube material. For example, a tube material in which a medium such as a coolant flows is produced by bending the aluminum alloy clad material and brazing the overlapped edges. Also, a header plate having a hole which is joined with an end of a tube material is produced by processing the aluminum alloy clad material. The heat exchanger according to the invention has a structure obtained for example by combining the tube material, a fin material and the header plate and brazing the materials at once.

As described above, a heat exchanger produced by brazing using the materials of the invention under general conditions is characterized in that the grain size of the sacrificial anode material of the aluminum alloy clad material after braze heating is 100 μm or more. The characteristic can improve the corrosion resistance of the sacrificial anode material after braze heating as described above.

The heat exchanger is assembled by attaching header plates to both ends of a tube material and placing a fin material on the outer surface of the tube material. Next, the overlapped edges of the tube material, the fin material and the outer surface of the tube material, the ends of the tube material and the header plates are each joined by one braze heating at once. As the brazing method, a Nocolok brazing method, a vacuum brazing method and a fluxless brazing method are used. Brazing is generally conducted by heating at a temperature of 590 to 610° C. for 2 to 10 minutes, preferably by heating at a temperature of 590 to 610° C. for two to six minutes. The brazed materials are generally cooled at a cooling rate of 20 to 500° C./min.

EXAMPLES

Next, the invention is explained in further detail based on Examples of the invention and Comparative Examples, but the invention is not restricted by the Examples.

Core material alloys with the alloy compositions shown in Table 1, sacrificial anode material alloys with the alloy compositions shown in Table 2, brazing filler metal alloys with the alloy compositions shown in Table 3 and intermediate layer material alloys with the alloy compositions shown in Table 4 were each cast by DC casting and finished by facing both surfaces. The thicknesses of the ingots after facing were all 400 mm. With respect to the brazing filler metals, the intermediate layer materials and the sacrificial anode materials, the cladding rates which would give the desired thicknesses as the final thicknesses were calculated, and the materials were subjected to a heating step at 520° C. for three hours and then hot rolled to the predetermined thicknesses which were the necessary thicknesses when the materials were combined. Some of the core material ingots were subjected to homogenization (Table 5 below).

TABLE 1

| | Alloy Symbol | Alloy Composition (mass %) | | | | | | | | | |
|---|---|---|---|---|---|---|---|---|---|---|---|
| | | Si | Fe | Cu | Mn | Mg | Ti | Zr | Cr | V | Al |
| Example of Invention | A1 | 0.50 | 0.20 | — | 1.10 | — | — | — | — | — | Balance |
| | A2 | 0.50 | 0.20 | — | 1.10 | 0.50 | 0.05 | — | — | — | Balance |
| | A3 | 0.50 | 0.20 | — | 1.50 | 0.05 | — | 0.05 | — | — | Balance |
| | A4 | 0.05 | 2.00 | — | 1.10 | — | — | — | 0.05 | — | Balance |
| | A5 | 1.50 | 0.05 | 0.05 | 0.50 | — | — | — | — | 0.05 | Balance |
| | A6 | 0.50 | 0.20 | — | 2.00 | — | 0.30 | 0.30 | 0.30 | 0.30 | Balance |
| | A7 | 1.20 | 0.20 | 0.05 | 1.10 | — | — | — | — | — | Balance |
| | A8 | 0.50 | 0.20 | 1.50 | 1.10 | — | — | — | — | — | Balance |
| Comparative Example | A9 | 1.60 | 0.20 | — | 1.10 | — | — | — | — | — | Balance |
| | A10 | 0.50 | 0.20 | — | 1.10 | 0.60 | — | 0.15 | — | — | Balance |
| | A11 | 0.50 | 2.20 | — | 1.50 | — | 0.15 | 0.15 | — | — | Balance |
| | A12 | 0.50 | 0.20 | — | 1.50 | — | 0.40 | 0.40 | 0.40 | 0.40 | Balance |
| | A13 | 0.50 | 0.20 | — | 2.20 | — | — | — | — | — | Balance |
| | A14 | 0.50 | 0.20 | 1.60 | 1.10 | — | — | — | — | — | Balance |
| | A15 | 0.50 | 0.20 | — | 0.40 | — | 0.05 | 0.05 | — | — | Balance |

TABLE 2

| | Alloy Symbol | Alloy Composition (mass %) | | | | | | | | | |
|---|---|---|---|---|---|---|---|---|---|---|---|
| | | Zn | Si | Fe | Mn | Mg | Ni | Ti | Zr | Cr | V | Al |
| Example of Invention | B1 | 2.00 | 0.20 | 0.20 | — | — | — | — | — | — | — | Balance |
| | B2 | 0.50 | 0.05 | 0.05 | — | — | — | 0.05 | — | — | — | Balance |
| | B3 | 8.00 | 0.20 | 0.20 | — | — | — | 0.30 | 0.30 | 0.30 | 0.30 | Balance |
| | B4 | 2.00 | 1.50 | 0.20 | — | — | — | — | 0.05 | — | — | Balance |
| | B5 | 2.00 | 0.20 | 2.00 | — | — | — | — | — | 0.05 | — | Balance |
| | B6 | 2.00 | 0.20 | 0.20 | 0.05 | — | — | — | — | — | 0.05 | Balance |

TABLE 2-continued

|  | Alloy Symbol | Alloy Composition (mass %) | | | | | | | | | | |
|---|---|---|---|---|---|---|---|---|---|---|---|---|
|  |  | Zn | Si | Fe | Mn | Mg | Ni | Ti | Zr | Cr | V | Al |
|  | B7 | 2.00 | 0.20 | 0.20 | 2.00 | — | — | — | — | — | — | Balance |
|  | B8 | 2.00 | 0.20 | 0.20 | — | 0.05 | — | — | — | — | — | Balance |
|  | B9 | 2.00 | 0.20 | 0.20 | — | 3.00 | — | — | — | — | — | Balance |
|  | B10 | 2.00 | 0.20 | 0.20 | — | — | 0.05 | — | — | — | — | Balance |
|  | B11 | 2.00 | 0.20 | 0.20 | — | — | 2.00 | — | — | — | — | Balance |
| Comparative | B12 | 2.00 | 1.60 | 0.20 | — | — | — | — | — | — | — | Balance |
| Example | B13 | 2.00 | 0.20 | 2.20 | — | — | — | — | — | — | — | Balance |
|  | B14 | 2.00 | 0.20 | 0.20 | — | — | — | 0.40 | 0.40 | 0.40 | 0.40 | Balance |
|  | B15 | 0.40 | 0.20 | 0.20 | — | — | — | — | — | — | — | Balance |
|  | B16 | 9.00 | 0.20 | 0.20 | — | — | — | — | — | — | — | Balance |
|  | B17 | 2.00 | 0.20 | 0.20 | — | 3.20 | — | — | — | — | — | Balance |
|  | B18 | 2.00 | 0.20 | 0.20 | — | — | 2.20 | — | — | — | — | Balance |
|  | B19 | 2.00 | 0.20 | 0.20 | 2.20 | — | — | — | — | — | — | Balance |

TABLE 3

|  | Alloy Symbol | Alloy Composition (mass %) | | | | | | | | | | | |
|---|---|---|---|---|---|---|---|---|---|---|---|---|---|
|  |  | Si | Fe | Cu | Mn | Zn | Ti | Zr | Cr | V | Na | Sr | Al |
| Example of | C1 | 10.00 | 0.20 | — | — | — | — | — | — | — | — | — | Balance |
| Invention | C2 | 2.50 | 0.20 | — | — | — | 0.05 | — | — | — | 0.001 | — | Balance |
|  | C3 | 13.00 | 0.20 | — | — | — | — | 0.05 | — | — | — | 0.001 | Balance |
|  | C4 | 10.00 | 0.05 | — | — | — | — | — | 0.05 | — | 0.050 | — | Balance |
|  | C5 | 10.00 | 1.20 | — | — | — | — | — | — | 0.05 | — | 0.050 | Balance |
|  | C6 | 10.00 | 0.20 | 0.05 | — | — | 0.30 | 0.30 | 0.30 | 0.30 | — | — | Balance |
|  | C7 | 10.00 | 0.20 | 1.50 | — | — | — | — | — | — | — | — | Balance |
|  | C8 | 10.00 | 0.20 | — | 0.05 | — | — | — | — | — | — | — | Balance |
|  | C9 | 10.00 | 0.20 | — | 2.00 | — | — | — | — | — | — | — | Balance |
|  | C10 | 10.00 | 0.20 | — | — | 0.50 | — | — | — | — | — | — | Balance |
|  | C11 | 10.00 | 0.20 | — | — | 8.00 | — | — | — | — | — | — | Balance |
|  | C12 | 10.00 | 0.20 | 0.60 | — | 0.50 | — | — | — | — | — | — | Balance |
| Comparative | C13 | 2.00 | 0.20 | — | — | — | — | — | — | — | — | — | Balance |
| Example | C14 | 14.00 | 0.20 | — | — | — | — | — | — | — | — | — | Balance |
|  | C15 | 10.00 | 1.40 | — | — | — | — | — | — | — | — | — | Balance |
|  | C16 | 10.00 | 0.20 | 1.60 | — | — | — | — | — | — | — | — | Balance |
|  | C17 | 10.00 | 0.20 | — | 2.20 | — | — | — | — | — | — | — | Balance |
|  | C18 | 10.00 | 0.20 | — | — | — | 0.40 | 0.40 | 0.40 | 0.40 | — | — | Balance |
|  | C19 | 10.00 | 0.20 | — | — | — | — | — | — | — | 0.060 | — | Balance |
|  | C20 | 10.00 | 0.20 | — | — | — | — | — | — | — | — | 0.060 | Balance |
|  | C21 | 10.00 | 0.20 | — | — | 0.40 | — | — | — | — | — | — | Balance |
|  | C22 | 10.00 | 0.20 | — | — | 9.00 | — | — | — | — | — | — | Balance |
|  | C23 | 10.00 | 0.20 | 0.70 | — | 0.50 | — | — | — | — | — | — | Balance |

TABLE 4

|  | Alloy Symbol | Alloy Composition (mass %) | | | | | | | | | |
|---|---|---|---|---|---|---|---|---|---|---|---|
|  |  | Zn | Si | Fe | Cu | Mn | Ti | Zr | Cr | V | Al |
| Example of | D1 | — | 0.20 | 0.20 | — | — | — | — | — | — | Balance |
| Invention | D2 | 0.50 | 0.05 | 0.05 | — | — | 0.05 | — | — | — | Balance |
|  | D3 | 8.00 | 0.20 | 0.20 | — | — | 0.30 | 0.30 | 0.30 | 0.30 | Balance |
|  | D4 | — | 1.50 | 0.20 | — | — | — | 0.05 | — | — | Balance |
|  | D5 | — | 0.20 | 2.00 | — | — | — | — | 0.05 | — | Balance |
|  | D6 | — | 0.20 | 0.20 | — | 0.05 | — | — | — | 0.05 | Balance |
|  | D7 | — | 0.20 | 0.20 | — | 2.00 | — | — | — | — | Balance |
|  | D8 | — | 0.20 | 0.20 | 0.05 | — | — | — | — | — | Balance |
|  | D9 | — | 0.20 | 0.20 | 1.50 | — | — | — | — | — | Balance |
| Comparative | D10 | — | 1.60 | 0.20 | — | — | — | — | — | — | Balance |
| Example | D11 | — | 0.20 | 2.20 | — | — | — | — | — | — | Balance |
|  | D12 | — | 0.20 | 0.20 | — | — | 0.40 | 0.40 | 0.40 | 0.40 | Balance |
|  | D13 | — | 0.20 | 0.20 | — | 2.20 | — | — | — | — | Balance |

TABLE 4-continued

| Alloy Symbol | Alloy Composition (mass %) | | | | | | | | | |
|---|---|---|---|---|---|---|---|---|---|---|
| | Zn | Si | Fe | Cu | Mn | Ti | Zr | Cr | V | Al |
| D14 | 0.40 | 0.20 | 0.20 | — | — | — | — | — | — | Balance |
| D15 | 9.00 | 0.20 | 0.20 | — | — | — | — | — | — | Balance |
| D16 | — | 0.20 | 0.20 | 1.60 | — | — | — | — | — | Balance |

Using the alloys, a sacrificial anode material in Table 2 was provided on a surface of a core material alloy. In some of the examples, a brazing filler metal in Table 3 was provided on the surface of the core material which was not the sacrificial anode material side. Moreover, in some of the examples, an intermediate layer material in Table 4 was provided on the surface of the core material which was not the sacrificial anode material side, and a brazing filler metal in Table 3 was provided on the surface of the intermediate layer material which was not the core material side. The cladding rates of the sacrificial anode material, the brazing filler metal and the intermediate layer material were all 10%.

Such combined materials were subjected to a heating step and then to a hot clad rolling step, and two-layer, three-layer and four-layer clad materials each with a thickness of 3.5 mm were produced. The temperatures and the times of the heating step and the start temperatures and the finish temperatures of the hot clad rolling step are shown in Table 5. Furthermore, in the hot clad rolling step, the clad materials were subjected to one or more rolling passes each with a rolling reduction of 30% or more while the temperatures of the clad materials were 200° C. to 400° C., and the numbers of the rolling passes are also shown in Table 5. Because the start temperatures were all 400° C. or higher and the finish temperatures were all 200° C. or higher and lower than 400° C. in the Examples of the invention, it is obvious that there was a pass(passes) while the temperatures of the clad materials were 200° C. to 400° C. After the hot clad rolling step, the clad materials were subjected to cold rolling, batch process annealing and final cold rolling, and clad material samples each with a final thickness of 0.3 mm and H1n refining type were produced. The reductions of the cold rolling after the process annealing were all 30%. Some of the materials were subjected to batch final annealing after the final cold rolling, and samples with H2n refining type were obtained. The conditions of the process annealing and the final annealing are shown in Table 5. As shown in Table 5, process annealing was not conducted in E8, and neither process annealing nor final annealing was conducted in E17 to 19. In E19, hot clad rolling was not conducted.

TABLE 5

| | | Homogenization Step of Core Material | | Hot Clad Rolling Step | | | | | Process Annealing | | | Final Annealing | |
|---|---|---|---|---|---|---|---|---|---|---|---|---|---|
| | | | | Heating Step | | Start | Finish | Number of Passes with | | | | | |
| | | Temperature (° C.) | Time (h) | Temperature (° C.) | Time (h) | Temperature (° C.) | Temperature (° C.) | Rolling Reduction of 30% or More | Time (h) | Temperature (° C.) | Number | Time (h) | Temperature (° C.) |
| Example of Invention | E1 | — | — | 480 | 5 | 460 | 230 | 3 | 5 | 350 | 1 | — | — |
| | E2 | — | — | 400 | 5 | 400 | 200 | 2 | 5 | 350 | 1 | — | — |
| | E3 | — | — | 550 | 5 | 520 | 250 | 4 | 1 | 350 | 1 | — | — |
| | E4 | — | — | 480 | 1 | 430 | 210 | 3 | 10 | 350 | 1 | — | — |
| | E5 | — | — | 480 | 10 | 460 | 220 | 3 | 5 | 200 | 1 | 5 | 200 |
| | E6 | — | — | 480 | 5 | 460 | 230 | 3 | 5 | 560 | 1 | 5 | 200 |
| | E7 | — | — | 480 | 5 | 460 | 230 | 5 | 5 | 350 | 2 | — | — |
| | E8 | — | — | 480 | 5 | 460 | 230 | 3 | — | — | — | 5 | 200 |
| | E9 | 450 | 1 | 480 | 5 | 460 | 230 | 3 | 5 | 350 | 1 | — | — |
| | E10 | 620 | 10 | 480 | 5 | 460 | 230 | 3 | 5 | 350 | 1 | — | — |
| Comparative Example | E11 | — | — | 480 | 5 | 460 | 250 | 6 | 5 | 350 | 1 | — | — |
| | E12 | — | — | 560 | 5 | 520 | 250 | 6 | 5 | 350 | 1 | — | — |
| | E13 | — | — | 560 | 5 | 530 | 250 | 3 | 5 | 350 | 1 | — | — |
| | E14 | — | — | 480 | 5 | 460 | 230 | 3 | 5 | 180 | 1 | — | — |
| | E15 | — | — | 480 | 5 | 460 | 230 | 3 | 5 | 570 | 1 | — | — |
| | E16 | — | — | 480 | 5 | 460 | 230 | 3 | 0.5 | 350 | 2 | — | — |
| | E17 | — | — | 380 | 5 | 330 | 150 | 3 | — | — | — | — | — |
| | E18 | — | — | 480 | 0.5 | 350 | 170 | 3 | — | — | — | — | — |
| | E19 | — | — | 570 | 5 | — | — | — | — | — | — | — | — |

The manufacturability was given a mark "○" when no problem arose during the production steps and the material could be rolled to the final thickness of 0.3 mm. The manufacturability was given a mark "×" when the material cracked during the casting or the rolling and thus the material could not be rolled to the final thickness of 0.3 mm or when a clad material could not be produced due to melting during the heating step before the hot clad rolling step or during the process annealing step or due to poor pressure bonding during the hot clad rolling. The results are shown in Tables 6 to 8. The combinations of the core material alloy, the sacrificial anode material alloy, the brazing filler metal alloy and the intermediate layer material alloy of the respective clad materials are also shown in Tables 6 to 8.

TABLE 6

|  |  | Alloy | | | | | | | Tensile Strength after Braze Heating | |
|---|---|---|---|---|---|---|---|---|---|---|
|  | No. | Core Material | Sacrificial Anode Material | Brazing Filler Metal | Intermediate Layer Material | Step | Manufacturability | Brazing Property | Formability | (MPa) | Determination |
| Example of Invention | 1 | A1 | B1 | C1 | — | E1 | ○ | ◎ | ○ | 142 | ○ |
|  | 2 | A2 | B2 | C2 | — | E1 | ○ | ○ | ○ | 179 | ○ |
|  | 3 | A3 | B3 | C3 | — | E1 | ○ | ○ | ○ | 148 | ○ |
|  | 4 | A4 | B4 | C4 | — | E1 | ○ | ◎ | ○ | 142 | ○ |
|  | 5 | A5 | B5 | C5 | — | E1 | ○ | ◎ | ○ | 160 | ○ |
|  | 6 | A6 | B6 | C6 | — | E1 | ○ | ◎ | ○ | 149 | ○ |
|  | 7 | A7 | B7 | C7 | — | E1 | ○ | ◎ | ○ | 159 | ○ |
|  | 8 | A8 | B8 | C8 | — | E1 | ○ | ◎ | ○ | 188 | ○ |
|  | 9 | A1 | B9 | C9 | — | E1 | ○ | ◎ | ○ | 140 | ○ |
|  | 10 | A1 | B10 | C10 | — | E1 | ○ | ◎ | ○ | 145 | ○ |
|  | 11 | A1 | B11 | C11 | — | E1 | ○ | ◎ | ○ | 142 | ○ |
|  | 12 | A2 | B1 | C12 | — | E1 | ○ | ◎ | ○ | 170 | ○ |
|  | 13 | A2 | B1 | C1 | D1 | E1 | ○ | ◎ | ○ | 169 | ○ |
|  | 14 | A2 | B1 | C1 | D2 | E1 | ○ | ◎ | ○ | 169 | ○ |
|  | 15 | A2 | B1 | C1 | D3 | E1 | ○ | ◎ | ○ | 175 | ○ |
|  | 16 | A2 | B1 | C1 | D4 | E1 | ○ | ◎ | ○ | 172 | ○ |
|  | 17 | A2 | B1 | C1 | D5 | E1 | ○ | ◎ | ○ | 176 | ○ |
|  | 18 | A2 | B1 | C1 | D6 | E1 | ○ | ◎ | ○ | 170 | ○ |
|  | 19 | A2 | B1 | C1 | D7 | E1 | ○ | ◎ | ○ | 177 | ○ |
|  | 20 | A2 | B1 | C1 | D8 | E1 | ○ | ◎ | ○ | 170 | ○ |
|  | 21 | A2 | B1 | C1 | D9 | E1 | ○ | ◎ | ○ | 174 | ○ |
|  | 22 | A1 | B1 | C1 | D2 | E1 | ○ | ◎ | ○ | 140 | ○ |
|  | 23 | A1 | B1 | C1 | D3 | E1 | ○ | ◎ | ○ | 143 | ○ |

|  |  | Grain size before Braze Heating | | | | Grain size after Braze Heating | Corrosion Resistance | |
|---|---|---|---|---|---|---|---|---|
|  |  | Sacrificial | Core Material | | |  Sacrificial |  | Sacrificial |
|  | No. | Anode Material (μm) | R1 (μm) | R2 (μm) | R1/R2 | Anode Material (μm) | Brazing Filler Metal Side | Anode Material Side |
| Example of Invention | 1 | 105 | 14 | 152 | 0.09 | 175 | — | ○ |
|  | 2 | 110 | 25 | 120 | 0.21 | 183 | — | ○ |
|  | 3 | 130 | 20 | 135 | 0.15 | 217 | — | ○ |
|  | 4 | 145 | 27 | 124 | 0.22 | 242 | — | ○ |
|  | 5 | 140 | 13 | 185 | 0.07 | 233 | — | ○ |
|  | 6 | 155 | 10 | 196 | 0.05 | 258 | — | ○ |
|  | 7 | 164 | 10 | 204 | 0.05 | 273 | — | ○ |
|  | 8 | 98 | 11 | 113 | 0.10 | 163 | ○ | ○ |
|  | 9 | 85 | 17 | 150 | 0.11 | 142 | ○ | ○ |
|  | 10 | 101 | 21 | 162 | 0.13 | 168 | — | ○ |
|  | 11 | 111 | 14 | 171 | 0.08 | 185 | — | ○ |
|  | 12 | 120 | 23 | 115 | 0.20 | 200 | — | ○ |
|  | 13 | 119 | 22 | 121 | 0.18 | 198 | ○ | ○ |
|  | 14 | 108 | 23 | 122 | 0.19 | 180 | ○ | ○ |
|  | 15 | 104 | 26 | 136 | 0.19 | 173 | ○ | ○ |
|  | 16 | 103 | 18 | 108 | 0.17 | 172 | — | ○ |
|  | 17 | 123 | 24 | 121 | 0.20 | 205 | — | ○ |
|  | 18 | 117 | 26 | 132 | 0.20 | 195 | — | ○ |
|  | 19 | 120 | 26 | 125 | 0.21 | 200 | — | ○ |
|  | 20 | 104 | 22 | 112 | 0.20 | 173 | — | ○ |
|  | 21 | 110 | 22 | 118 | 0.19 | 183 | — | ○ |
|  | 22 | 119 | 24 | 121 | 0.20 | 198 | ○ | ○ |
|  | 23 | 108 | 23 | 122 | 0.19 | 180 | ○ | ○ |

TABLE 7

| | No. | Core Material | Sacrificial Anode Material | Brazing Filler Metal | Intermediate Layer Material | Step | Manufacturability | Brazing Property |
|---|---|---|---|---|---|---|---|---|
| Comparative Example | 24 | A9 | B1 | C1 | — | E1 | ○ | X |
| | 25 | A10 | B1 | C1 | — | E1 | ○ | X |
| | 26 | A11 | B1 | C1 | — | E1 | X | — |
| | 27 | A12 | B1 | C1 | — | E1 | X | — |
| | 28 | A13 | B1 | C1 | — | E1 | X | — |
| | 29 | A14 | B1 | C1 | — | E1 | X | — |
| | 30 | A15 | B1 | C1 | — | E1 | ○ | ◎ |
| | 31 | A1 | B12 | C1 | — | E1 | ○ | ◎ |
| | 32 | A1 | B13 | C1 | — | E1 | X | — |
| | 33 | A1 | B14 | C1 | — | E1 | X | — |
| | 34 | A1 | B15 | C1 | — | E1 | ○ | ◎ |
| | 35 | A1 | B16 | C1 | — | E1 | ○ | ◎ |
| | 36 | A1 | B17 | C1 | — | E1 | X | — |
| | 37 | A1 | B18 | C1 | — | E1 | X | — |
| | 38 | A1 | B19 | C1 | — | E1 | X | — |
| | 39 | A1 | B1 | C13 | — | E1 | ○ | X |
| | 40 | A1 | B1 | C14 | — | E1 | ○ | X |
| | 41 | A1 | B1 | C15 | — | E1 | ○ | X |
| | 42 | A1 | B1 | C16 | — | E1 | X | — |
| | 43 | A1 | B1 | C17 | — | E1 | X | — |
| | 44 | A1 | B1 | C18 | — | E1 | X | — |
| | 45 | A1 | B1 | C19 | — | E1 | ○ | X |
| | 46 | A1 | B1 | C20 | — | E1 | ○ | X |
| | 47 | A1 | B1 | C21 | — | E1 | ○ | ◎ |
| | 48 | A1 | B1 | C22 | — | E1 | ○ | ◎ |
| | 49 | A2 | B1 | C1 | D10 | E1 | ○ | X |
| | 50 | A2 | B1 | C1 | D11 | E1 | X | — |
| | 51 | A2 | B1 | C1 | D12 | E1 | X | — |
| | 52 | A2 | B1 | C1 | D13 | E1 | X | — |
| | 53 | A2 | B1 | C1 | D14 | E1 | ○ | ◎ |
| | 54 | A2 | B1 | C1 | D15 | E1 | ○ | ◎ |
| | 55 | A2 | B1 | C1 | D16 | E1 | X | — |
| | 56 | A1 | B1 | C1 | D14 | E1 | ○ | ◎ |
| | 57 | A1 | B1 | C1 | D15 | E1 | ○ | ◎ |

| | | | Tensile Strength after Braze Heating | | Grain size before Braze Heating | | | |
| | | | | | Sacrificial Anode | Core Material | | |
| | No. | Formability | (MPa) | Determination | Material (μm) | R1 (μm) | R2 (μm) | R1/R2 |
|---|---|---|---|---|---|---|---|---|
| Comparative Example | 24 | ○ | 167 | ○ | 100 | 6 | 214 | 0.03 |
| | 25 | ○ | 186 | ○ | 109 | 23 | 96 | 0.24 |
| | 26 | — | — | — | — | — | — | — |
| | 27 | — | — | — | — | — | — | — |
| | 28 | — | — | — | — | — | — | — |
| | 29 | — | — | — | — | — | — | — |
| | 30 | ○ | 113 | X | 102 | 20 | 102 | 0.20 |
| | 31 | ○ | 146 | ○ | 183 | 16 | 161 | 0.10 |
| | 32 | — | — | — | — | — | — | — |
| | 33 | — | — | — | — | — | — | — |
| | 34 | ○ | 145 | ○ | 102 | 19 | 170 | 0.11 |
| | 35 | ○ | 144 | ○ | 96 | 17 | 166 | 0.10 |
| | 36 | — | — | — | — | — | — | — |
| | 37 | — | — | — | — | — | — | — |
| | 38 | — | — | — | — | — | — | — |
| | 39 | ○ | 142 | ○ | 118 | 14 | 154 | 0.09 |
| | 40 | ○ | 144 | ○ | 103 | 17 | 169 | 0.10 |
| | 41 | ○ | 142 | ○ | 121 | 16 | 158 | 0.10 |
| | 42 | — | — | — | — | — | — | — |
| | 43 | — | — | — | — | — | — | — |
| | 44 | — | — | — | — | — | — | — |
| | 45 | ○ | 145 | ○ | 108 | 16 | 137 | 0.12 |
| | 46 | ○ | 141 | ○ | 100 | 15 | 134 | 0.11 |
| | 47 | ○ | 143 | ○ | 104 | 15 | 149 | 0.10 |
| | 48 | ○ | 140 | ○ | 109 | 15 | 154 | 0.10 |
| | 49 | ○ | 172 | ○ | 102 | 23 | 110 | 0.21 |
| | 50 | — | — | — | — | — | — | — |
| | 51 | — | — | — | — | — | — | — |
| | 52 | — | — | — | — | — | — | — |
| | 53 | ○ | 173 | ○ | 105 | 26 | 128 | 0.20 |

TABLE 7-continued

| | | | | | | | | |
|---|---|---|---|---|---|---|---|---|
| | 54 | ○ | 170 | ○ | 113 | 21 | 115 | 0.18 |
| | 55 | — | — | — | — | — | — | — |
| | 56 | ○ | 142 | ○ | 105 | 23 | 120 | 0.19 |
| | 57 | ○ | 140 | ○ | 113 | 22 | 112 | 0.20 |

| | No. | Grain size after Braze Heating Sacrificial Anode Material (μm) | Corrosion Resistance Brazing Filler Metal Side | Corrosion Resistance Sacrificial Anode Material Side |
|---|---|---|---|---|
| Comparative Example | 24 | 167 | — | ○ |
| | 25 | 182 | — | ○ |
| | 26 | — | — | — |
| | 27 | — | — | — |
| | 28 | — | — | — |
| | 29 | — | — | — |
| | 30 | 170 | — | ○ |
| | 31 | 305 | — | X |
| | 32 | — | — | — |
| | 33 | — | — | — |
| | 34 | 170 | — | X |
| | 35 | 160 | — | X |
| | 36 | — | — | — |
| | 37 | — | — | — |
| | 38 | — | — | — |
| | 39 | 197 | — | ○ |
| | 40 | 172 | — | ○ |
| | 41 | 202 | — | ○ |
| | 42 | — | — | — |
| | 43 | — | — | — |
| | 44 | — | — | — |
| | 45 | 180 | — | ○ |
| | 46 | 167 | — | ○ |
| | 47 | 173 | X | ○ |
| | 48 | 182 | X | ○ |
| | 49 | 170 | — | ○ |
| | 50 | — | — | — |
| | 51 | — | — | — |
| | 52 | — | — | — |
| | 53 | 175 | X | ○ |
| | 54 | 188 | X | ○ |
| | 55 | — | — | — |
| | 56 | 175 | X | ○ |
| | 57 | 188 | X | ○ |

TABLE 8

| | No. | Alloy Core Material | Alloy Sacrificial Anode Material | Alloy Brazing Filler Metal | Alloy Intermediate Layer Material | Manufacturing Step | Manufacturability | Brazing Property | Formability | Tensile Strength after Braze Heating (MPa) | Determination |
|---|---|---|---|---|---|---|---|---|---|---|---|
| Example of Invention | 58 | A1 | B1 | — | — | E2 | ○ | — | ○ | 148 | ○ |
| | 59 | A1 | B1 | — | — | E3 | ○ | — | ○ | 139 | ○ |
| | 60 | A1 | B1 | — | — | E4 | ○ | — | ○ | 140 | ○ |
| | 61 | A1 | B1 | — | — | E5 | ○ | — | ○ | 143 | ○ |
| | 62 | A1 | B1 | — | — | E6 | ○ | — | ○ | 144 | ○ |
| | 63 | A1 | B1 | — | — | E7 | ○ | — | ○ | 141 | ○ |
| | 64 | A1 | B1 | — | — | E8 | ○ | — | ○ | 148 | ○ |
| | 65 | A1 | B1 | — | — | E9 | ○ | — | ○ | 139 | ○ |
| | 66 | A1 | B1 | — | — | E10 | ○ | — | ○ | 137 | ○ |
| Comparative Example | 67 | A1 | B1 | — | — | E11 | ○ | — | X | 142 | ○ |
| | 68 | A1 | B1 | — | — | E12 | ○ | — | X | 139 | ○ |
| | 69 | A1 | B1 | — | — | E13 | ○ | — | ○ | 136 | ○ |
| | 70 | A1 | B1 | — | — | E14 | ○ | — | ○ | 142 | ○ |
| | 71 | A1 | B1 | — | — | E15 | X | — | — | — | — |
| | 72 | A1 | B1 | — | — | E16 | ○ | — | ○ | 140 | ○ |
| | 73 | A1 | B1 | — | — | E17 | X | — | — | — | — |
| | 74 | A1 | B1 | — | — | E18 | X | — | — | — | — |
| | 75 | A1 | B1 | — | — | E19 | X | — | — | — | — |

TABLE 8-continued

|  |  | Grain size before Braze Heating | | | | Grain size after Braze Heating | Corrosion Resistance | |
| --- | --- | --- | --- | --- | --- | --- | --- | --- |
|  |  | Sacrificial | Core Material | | | Sacrificial | | Sacrificial |
|  | No. | Anode Material (μm) | R1 (μm) | R2 (μm) | R1/R2 | Anode Material (μm) | Brazing Filler Metal Side | Anode Material Side |
| Example of Invention | 58 | 132 | 7 | 181 | 0.04 | 220 | — | ○ |
|  | 59 | 62 | 20 | 131 | 0.15 | 103 | — | ○ |
|  | 60 | 112 | 13 | 157 | 0.08 | 187 | — | ○ |
|  | 61 | 97 | 23 | 142 | 0.16 | 162 | — | ○ |
|  | 62 | 132 | 18 | 150 | 0.12 | 220 | — | ○ |
|  | 63 | 110 | 43 | 155 | 0.28 | 183 | — | ○ |
|  | 64 | 128 | 12 | 101 | 0.12 | 213 | — | ○ |
|  | 65 | 133 | 10 | 104 | 0.10 | 222 | — | ○ |
|  | 66 | 135 | 13 | 100 | 0.13 | 225 | — | ○ |
| Comparative Example | 67 | 130 | 38 | 96 | 0.40 | 217 | — | ○ |
|  | 68 | 131 | 35 | 99 | 0.35 | 218 | — | ○ |
|  | 69 | 56 | 23 | 151 | 0.15 | 93 | — | X |
|  | 70 | Fibrous | 15 | 152 | 0.10 | 82 | — | X |
|  | 71 | — | — | — | — | — | — | — |
|  | 72 | Fibrous | 18 | 167 | 0.11 | 75 | — | X |
|  | 73 | — | — | — | — | — | — | — |
|  | 74 | — | — | — | — | — | — | — |
|  | 75 | — | — | — | — | — | — | — |

The following items of the clad material samples were evaluated, and the results are also shown in Tables 6 to 8. In this regard, in the examples with the manufacturability marked with "×" in Tables 7 and 8, samples could not be produced, and thus the following evaluation could not be conducted.

(Evaluation of Formability)

JIS5 test pieces were cut out of the respective clad material samples, stretched by 5% in the direction parallel to the rolling direction and bent at 180° with a bending radius R of 0.05 mm with the sacrificial anode material surface inside. A resin was applied to the bent R cross sections so that the cross sections could be observed, and the cross sections were subjected to mirror polishing. Then, the test pieces were evaluated as to whether there was a crack using an optical microscope. As a result, the formability was determined to be at an acceptable level (○) when there was no crack in the core material and at an unacceptable level (×) when there was a crack in the core material. The occurrence of cracks in the sacrificial anode materials, the brazing filler metals and the intermediate layer materials was not evaluated.

(Evaluation of Brazing Property)

A fin material with a thickness of 0.07 mm, refining type of H14 and an alloy composition of 3003 alloy containing 1.0% Zn was prepared and corrugated, and thus a heat exchanger fin material was prepared. The fin material was placed on the brazing filler metal side of a clad material sample, and the sample was dipped in an aqueous 5% fluoride flux solution and subjected to braze heating at 600° C. for three minutes, thereby producing a miniature core sample. The brazing property was determined to be excellent ◉ when the fin joint ratio of the miniature core sample was 100% and the clad material sample and the fin did not melt; the brazing property was determined to be at an acceptable level (○) when the fin joint ratio was 95% or more and less than 100% and the clad material sample and the fin did not melt; and the brazing property was determined to be at an unacceptable level (×) when the fin joint ratio was less than 95% and both or either of the clad material sample and the fin melted. This evaluation item was skipped for the samples in which no brazing filler metal was clad. The samples with the marks ◉ and ○ were determined to be at an acceptable level, and the samples with the mark × were determined to be at an unacceptable level.

(Measurement of Tensile Strength after Braze Heating)

The clad material samples were subjected to heat treatment at 600° C. for three minutes (corresponding to braze heating) and then to a tensile test under the conditions of a speed of tensile testing of 10 mm/min and a gauge length of 50 mm according to JIS 22241. The tensile strengths were read from the obtained stress-strain curves. As a result, the tensile strength was determined to be at an acceptable level (○) when the value was 120 MPa or more and at an unacceptable level (×) when the value was less than 120 MPa.

(Measurement of Grain size of Sacrificial Anode Material)

The sacrificial material surfaces of clad material samples which were not subjected to heating treatment and clad material samples which were subjected to heat treatment at 600° C. for three minutes (corresponding to braze heating) were subjected to mirror polishing, and samples for the measurement of the sacrificial anode material crystal grains were thus prepared. An area of 2 mm×2 mm of each sample was analyzed by EBSD of a SEM (scanning electron microscope). Boundaries with a difference between crystal orientations of 20 degrees or more were detected as the grain boundaries from the results, and the grain sizes (equivalent circle diameters) were calculated. Three random points were selected for the measurement, and the arithmetic mean was regarded as the grain size. When the recrystallization of the sacrificial anode material had not been completed, the sacrificial anode material had a fibrous structure, and the grain size could not be measured. Such samples are indicated by "fibrous".

(Measurement of Grain size of Core Material)

Clad material samples which were not subjected to heating treatment were used. A resin was applied to the clad material samples and mirror polishing was conducted in such a manner that the cross sections along the rolling directions became the surfaces to be measured. Thus, samples for the measurement of the core material crystal grains were prepared. An area with a length of 2 mm and a thickness of 0.2 mm of each sample was analyzed by EBSD of a SEM, and from the results, boundaries with a difference between crystal orientations of 20 degrees or more were detected as the grain boundaries to detect the crystal grains. The maximum diameter R1 of a crystal grain in the thickness direction and the maximum diameter R2 in the rolling direction were measured, and the value R1/R2 was calculated. Three random crystal grains in a single field were measured, and the arithmetic mean was regarded as the ratio R1/R2. When no crystal grain boundary was detected by EBSD, the mirror-polished samples were subjected to anodic oxidation and observed using a polarized light microscope. The R1 was regarded as zero when a fibrous structure like the structure shown in FIG. 3 was observed.

(Corrosion Resistance at Brazing Filler Metal Side)

The same miniature core samples as those used for evaluating the brazing property were used. The sacrificial anode material surfaces of the clad material samples were masked with an insulating resin, and the brazing filler metal surfaces were subjected to a CASS test based on JIS-H8502 for 500 hours. As a result, the CASS corrosion resistance was determined to be at an acceptable level (○) when corrosion perforation did not develop in the clad material within the 500 hours and at an unacceptable level (×) when corrosion perforation developed within the 500 hours. This item was evaluated for the samples having a brazing filler metal containing Zn and the samples in which an intermediate layer material containing Zn was clad.

(Corrosion Resistance at Sacrificial Material Side)

A piece of clad material sample was folded with the sacrificial anode material inside, and the sacrificial anode material parts were put together. Then, heat treatment at 600° C. for three minutes (corresponding to braze heating) was conducted. Then, after unfolding the upper part, the brazing filler metal side was masked with an insulating resin, and the sacrificial anode material surface was subjected to a test. Such folded samples were subjected to a cyclic dipping test with a cycle of eight-hour dipping in high temperature water at 88° C. containing 500 ppm Cl$^-$, 100 ppm SO$_4^{2-}$ and 10 ppm Cu$^{2+}$ and 16-hour leaving at room temperature for three months. As a result, the corrosion resistance was determined to be at an acceptable level (○) when corrosion perforation did not develop in the clad material within the three months and at an unacceptable level (×) when corrosion perforation developed within the three months.

Examples 1 to 23 and 58 to 66 of the invention satisfied the conditions defined in the invention, and the manufacturability, the brazing properties, the formability, the tensile strengths after brazing and the corrosion resistance were all at acceptable levels.

On the contrary, in Comparative Example 24, since the Si component of the core material was too much, the brazing property was unacceptable.

In Comparative Example 25, since the Mg component of the core material was too much, the brazing property was unacceptable.

In Comparative Example 26, since the Fe component of the core material was too much, a crack was caused during the rolling, and a clad material could not be produced. Thus, the manufacturability was unacceptable.

In Comparative Example 27, since the Ti, Zr, Cr and V components of the core material were too much, a crack was caused during the rolling, and a clad material could not be produced. Thus, the manufacturability was unacceptable.

In Comparative Example 28, since the Mn component of the core material was too much, a crack was caused during the rolling, and a clad material could not be produced. Thus, the manufacturability was unacceptable.

In Comparative Example 29, since the Cu component of the core material was too much, a crack was caused during the casting, and a clad material could not be produced. Thus, the manufacturability was unacceptable.

In Comparative Example 30, since the Mn component of the core material was too little, the tensile strength after the braze heating was unacceptable.

In Comparative Example 31, since the Si component of the sacrificial anode material was too much, the corrosion resistance at the sacrificial anode material side was unacceptable.

In Comparative Example 32, since the Fe component of the sacrificial anode material was too much, a crack was caused during the rolling, and a clad material could not be produced. Thus, the manufacturability was unacceptable.

In Comparative Example 33, since the Ti, Zr, Cr and V components of the sacrificial anode material were too much, a crack was caused during the rolling, and a clad material could not be produced. Thus, the manufacturability was unacceptable.

In Comparative Example 34, since the Zn component of the sacrificial anode material was too little, the corrosion resistance at the sacrificial anode material side was unacceptable.

In Comparative Example 35, since the Zn component of the sacrificial anode material was too much, the corrosion resistance at the sacrificial anode material side was unacceptable.

In Comparative Example 36, since the Mg component of the sacrificial anode material was too much, the core material and the sacrificial anode material were not pressure bonded during the hot clad rolling, and the manufacturability was unacceptable.

In Comparative Example 37, since the Ni component of the sacrificial anode material was too much, a crack was caused during the rolling, and a clad material could not be produced. Thus, the manufacturability was unacceptable.

In Comparative Example 38, since the Mn component of the sacrificial anode material was too much, a crack was caused during the rolling, and a clad material could not be produced. Thus, the manufacturability was unacceptable.

In Comparative Example 39, since the Si component of the brazing filler metal was too little, the brazing property was unacceptable.

In Comparative Example 40, since the Si component of the brazing filler metal was too much, the brazing property was unacceptable.

In Comparative Example 41, since the Fe component of the brazing filler metal was too much, the brazing property was unacceptable.

In Comparative Example 42, since the Cu component of the brazing filler metal was too much, a crack was caused during the casting, and a clad material could not be produced. Thus, the manufacturability was unacceptable.

In Comparative Example 43, since the Mn component of the brazing filler metal was too much, a crack was caused during the rolling, and a clad material could not be produced. Thus, the manufacturability was unacceptable.

In Comparative Example 44, since the Ti, Zr, Cr and V components of the brazing filler metal were too much, a crack was caused during the rolling, and a clad material could not be produced. Thus, the manufacturability was unacceptable.

In Comparative Example 45, since the Na component of the brazing filler metal was too much, the brazing property was unacceptable.

In Comparative Example 46, since the Sr component of the brazing filler metal was too much, the brazing property was unacceptable.

In Comparative Example 47, since the Zn component of the brazing filler metal was too little, the corrosion resistance at the brazing filler metal side was unacceptable.

In Comparative Example 48, since the Zn component of the brazing filler metal was too much, the corrosion resistance at the brazing filler metal side was unacceptable.

In Comparative Example 49, since the Si component of the intermediate layer material was too much, the brazing property was unacceptable.

In Comparative Example 50, since the Fe component of the intermediate layer material was too much, a crack was caused during the rolling, and a clad material could not be produced. Thus, the manufacturability was unacceptable.

In Comparative Example 51, since the Ti, Zr, Cr and V components of the intermediate layer material were too much, a crack was caused during the rolling, and a clad material could not be produced. Thus, the manufacturability was unacceptable.

In Comparative Example 52, since the Mn component of the intermediate layer material was too much, a crack was caused during the rolling, and a clad material could not be produced. Thus, the manufacturability was unacceptable.

In Comparative Example 53, since the Zn component of the intermediate layer material was too little, the corrosion resistance at the brazing filler metal side was unacceptable.

In Comparative Example 54, since the Zn component of the intermediate layer material was too much, the corrosion resistance at the brazing filler metal side was unacceptable.

In Comparative Example 55, since the Cu component of the intermediate layer material was too much, a crack was caused during the casting, and a clad material could not be produced. Thus, the manufacturability was unacceptable.

In Comparative Example 56, since the Zn component of the intermediate layer material was too little, the corrosion resistance at the brazing filler metal side was unacceptable.

In Comparative Example 57, since the Zn component of the intermediate layer material was too much, the corrosion resistance at the brazing filler metal side was unacceptable.

In Comparative Examples 67 and 68, the numbers of passes with a rolling reduction of 30% or more were more than five while the temperatures of the materials were 250° C. to 400° C. during the clad hot rolling. Thus, the ratios R1/R2 of the core material crystal grains were more than 0.30 before the brazing, and the formability was unacceptable.

In Comparative Example 69, the temperature of the material was higher than 520° C. at the start of the clad hot rolling. Thus, the grain size of the sacrificial anode material was less than 60 μm before the brazing, and the grain size of the sacrificial anode material was less than 100 μm after the brazing. Therefore, the corrosion resistance at the sacrificial anode material side was unacceptable.

In Comparative Example 70, the temperature of the process annealing was lower than 200° C. Thus, the sacrificial anode material had a fibrous structure before the brazing, and the grain size of the sacrificial anode material was less than 100 μm after the brazing. Therefore, the corrosion resistance at the sacrificial anode material side was unacceptable.

In Comparative Example 71, since the temperature of the process annealing was higher than 560° C., the brazing filler metal melted, and a clad material could not be produced. Thus, the manufacturability was unacceptable.

In Comparative Example 72, the process annealing time was shorter than one hour. Thus, the sacrificial anode material had a fibrous structure before the brazing, and the grain size of the sacrificial anode material was less than 100 μm after the brazing. Therefore, the corrosion resistance at the sacrificial anode material side was unacceptable.

In Comparative Example 73, the heating temperature was too low, and as a result, the start temperature of the hot clad rolling was lower than 400° C. Thus, a crack was caused during the hot clad rolling, and a brazing sheet with the desired thickness could not be produced.

In Comparative Example 74, the heating time was too short, and as a result, the start temperature of the hot clad rolling was lower than 400° C. Thus, a crack was caused during the hot clad rolling, and a brazing sheet with the desired thickness could not be produced.

In Comparative Example 75, since the heating temperature was too high, the brazing filler metal melted, and a brazing sheet with the desired thickness could not be produced.

INDUSTRIAL APPLICABILITY

The aluminum alloy clad material according to the invention has high strength after brazing and is excellent in the brazing properties such as the fin joint ratio and the erosion resistance and the corrosion resistance. Thus, the aluminum alloy clad material is preferably used as a part forming a flow path of an automobile heat exchanger in particular.

REFERENCE SIGNS LIST

R1: Grain size in the thickness direction in a core material cross section along the rolling direction
R2: Grain size in the rolling direction in a core material cross section along the rolling direction

The invention claimed is:
1. A method for producing an aluminum alloy clad material having an aluminum alloy core material and a sacrificial anode material clad on at least one surface of the core material, comprising:
   a step of casting the aluminum alloys for the core material and the sacrificial anode material, respectively,
   a hot rolling step of hot rolling a cast sacrificial anode material ingot to a predetermined thickness,
   a cladding step of cladding the sacrificial anode material rolled to the predetermined thickness on at least one surface of a core material ingot obtained by casting the aluminum alloy for the core material and thus obtaining a clad material,
   a hot clad rolling step of hot rolling the clad material,
   a cold rolling step of cold rolling the hot-rolled clad material, and
   one or more annealing steps of annealing the clad material either during or after the cold rolling step or both during and after the cold rolling step:
   wherein in the hot clad rolling step, the rolling start temperature is 400 to 520° C., and the number of rolling passes each with a rolling reduction of 30% or more is restricted to one to five while the temperature of the clad material is 200 to 400° C., and
   the clad material is held at 200 to 560° C. for 1 to 10 hours in the annealing step(s),
   wherein the core material comprises an aluminum alloy comprising 0.05 to 1.50 mass % Si, 0.05 to 2.00 mass

% Fe, 0.50 to 2.00 mass % Mn and a balance of Al and unavoidable impurities based on a total mass of the core material, the sacrificial anode material comprises an aluminum alloy comprising 0.50 to 8.00 mass % Zn, 0.05 to 1.50 mass % Si, 0.05 to 2.00 mass % Fe and a balance of Al and unavoidable impurities based on a total mass of the sacrificial anode material, a grain size of the sacrificial anode material is 60 vim or more, and a ratio R1/R2 is 0.30 or less, when R1 (µm) is a grain size in a thickness direction and R2 (µm) is a grain size in a rolling direction in a cross section of the core material along the rolling direction.

* * * * *